United States Patent
Zeine et al.

(10) Patent No.: US 11,916,407 B2
(45) Date of Patent: Feb. 27, 2024

(54) CONTROLLED WIRELESS CHARGING IN AN ELECTROMAGNETICALLY SHIELDED ENVIRONMENT

(71) Applicant: Ossia Inc., Redmond, WA (US)

(72) Inventors: Hatem Ibrahim Zeine, Woodinville, WA (US); Kellen Chow, Woodinville, WA (US); Cosan Caglayan, Seattle, WA (US); Matthew William Colleen, Seattle, WA (US); Caner Guclu, Bellevue, WA (US)

(73) Assignee: Ossia Inc., Redmond, WA (US)

( * ) Notice: Subject to any disclaimer, the term of this patent is extended or adjusted under 35 U.S.C. 154(b) by 0 days.

(21) Appl. No.: 17/807,612

(22) Filed: Jun. 17, 2022

(65) Prior Publication Data
US 2023/0043157 A1 Feb. 9, 2023

Related U.S. Application Data

(60) Provisional application No. 63/229,129, filed on Aug. 4, 2021.

(51) Int. Cl.
*H02J 50/70* (2016.01)
*H02J 50/20* (2016.01)
*H02J 50/80* (2016.01)

(52) U.S. Cl.
CPC .............. *H02J 50/70* (2016.02); *H02J 50/20* (2016.02); *H02J 50/80* (2016.02)

(58) Field of Classification Search
None
See application file for complete search history.

(56) References Cited

U.S. PATENT DOCUMENTS

| 5,744,933 A | 4/1998 | Inoue et al. |
| 6,281,851 B1 * | 8/2001 | Tay .......................... H01Q 11/08 343/702 |
| 6,867,685 B1 * | 3/2005 | Stillwagon .............. E05B 5/003 292/341.16 |

(Continued)

OTHER PUBLICATIONS

International Search Report and Written Opinion issued for PCT/US2022/34198, dated Sep. 13, 2022, 14 pgs.

*Primary Examiner* — Adi Amrany
(74) *Attorney, Agent, or Firm* — Amin, Turocy & Watson, LLP

(57) ABSTRACT

The technology is generally directed towards wireless power charging of one or more receiver devices within a container that is electromagnetically shielded with respect to the frequency or frequencies used for the wireless charging. A controller determines, via signaling from one or more sensors, that the container is in the electromagnetically shielded state with respect to emitting external radiation at the charging frequency or frequencies. When electromagnetically shielded, the controller controls the output power state of a wireless power transmitter device to charge the one or more receiver devices. The controller can determine when to stop the charging of a receiver device, such as when sufficiently charged. The controller and wireless power transmitter device can charge the one or more receiver devices selectively, e.g., based on which one needs more charge or other criterion. The controller can obtain and externally communicate the state of charge of the receiver device(s).

20 Claims, 18 Drawing Sheets

(56) References Cited

U.S. PATENT DOCUMENTS

| | | | |
|---|---|---|---|
| 2009/0286476 A1* | 11/2009 | Toncich | G06K 7/10178 |
| | | | 455/41.1 |
| 2013/0147427 A1* | 6/2013 | Polu | H02J 50/001 |
| | | | 320/108 |
| 2014/0353983 A1* | 12/2014 | Vetter | E05C 3/042 |
| | | | 292/197 |
| 2015/0137732 A1 | 5/2015 | Lai et al. | |
| 2016/0372948 A1 | 12/2016 | Kvols | |
| 2018/0186531 A1* | 7/2018 | McBride | G07C 9/00944 |
| 2020/0169315 A1* | 5/2020 | Anderson | H04W 92/20 |
| 2021/0143681 A1 | 5/2021 | Farkas | |
| 2021/0367437 A1* | 11/2021 | Butler | G07C 9/00174 |
| 2022/0068078 A1* | 3/2022 | Schmidt | G06Q 20/3224 |
| 2022/0219028 A1* | 7/2022 | Asserson | A62C 3/002 |

\* cited by examiner

CONTROLLED WIRELESS CHARGING IN AN ELECTROMAGNETICALLY SHIELDED ENVIRONMENT

CROSS-REFERENCE TO RELATED APPLICATION

This application is a non-provisional of pending U.S. Provisional Patent Application No. 63/229,129, filed on Aug. 4, 2021 entitled "CONTROLLED WIRELESS CHARGING IN AN ELECTROMAGNETICALLY SHIELDED ENVIRONMENT." The entirety of the aforementioned application is hereby incorporated herein by reference.

TECHNICAL FIELD

The subject disclosure generally relates to wireless power transmission, including for charging multiple electronic devices in an electromagnetically shielded environment, and related embodiments.

BACKGROUND

Directed antenna systems can transmit wireless power over electromagnetic (e.g., radio frequency, or RF) signals to various devices that include wireless power receivers. More particularly, a wireless power transmitter transmits RF signals via an antenna (one or more antenna elements) to a wireless power receiver comprising an antenna and circuitry, in a suitable device, that converts the received RF signals into direct current (DC).

In general, transmitting wireless power over RF signals provides for wireless power over relatively long distances compared to the short electromagnetic field distances needed for inductive charging type systems. As is understood, such relatively long distance wireless charging eliminates the need for wired charging cables, resonant coupling or inductive coupling.

BRIEF DESCRIPTION OF THE DRAWINGS

Non-limiting embodiments of the subject disclosure are described with reference to the following figures, wherein like reference numerals refer to like parts throughout the various views unless otherwise specified.

DETAILED DESCRIPTION

The technology described herein is generally directed towards wirelessly charging electronic devices comprising wireless power receivers ("client devices" or simply "clients") configured for wireless charging. Charging occurs when the electronic devices are located within a container that is shielded with respect to radio frequency emissions outside the container; charging stops when the container is in an unshielded state. The technology described herein thus facilitates "mass" charging of relatively many such electronic devices, such as radio frequency identification (RFID) tags, and/or global positioning system (GPS) trackers, without the use of cables, charging harnesses or the like, and/or the need for accurate device positioning within or very near a charger mechanism. The technology also facilitates charging as little as one electronic device within the container, such as a consumer wearable device, a battery housing containing a wireless receiver and a small battery, and so on.

In one or more implementations, charging occurs when a sensor detects that the container is in a "closed" state, that is when physically shielded from externally emitting electromagnetic (EM) charging signals, e.g., radio frequency (RF) signals or at least those RF signals at the frequency or frequencies (or within a frequency range) used for charging. Charging stops (or is significantly reduced in power output) when a sensor detects that the container is in an "open" state that would otherwise allow the charging signals to be emitted.

Aspects of the subject disclosure will now be described more fully hereinafter with reference to the accompanying drawings in which example embodiments are shown. In the following description, for purposes of explanation, numerous specific details are set forth in order to provide a thorough understanding of the various embodiments. However, the subject disclosure may be embodied in many different forms and should not be construed as limited to the example embodiments set forth herein.

Reference throughout this specification to "one embodiment," "an embodiment," etc. means that a particular feature, structure, or characteristic described in connection with the embodiment is included in at least one embodiment. Thus, the appearances of the phrase "in one embodiment," "in an embodiment," etc. in various places throughout this specification are not necessarily all referring to the same embodiment. Furthermore, the particular features, structures, or characteristics may be combined in any suitable manner in one or more embodiments.

Figure 1:
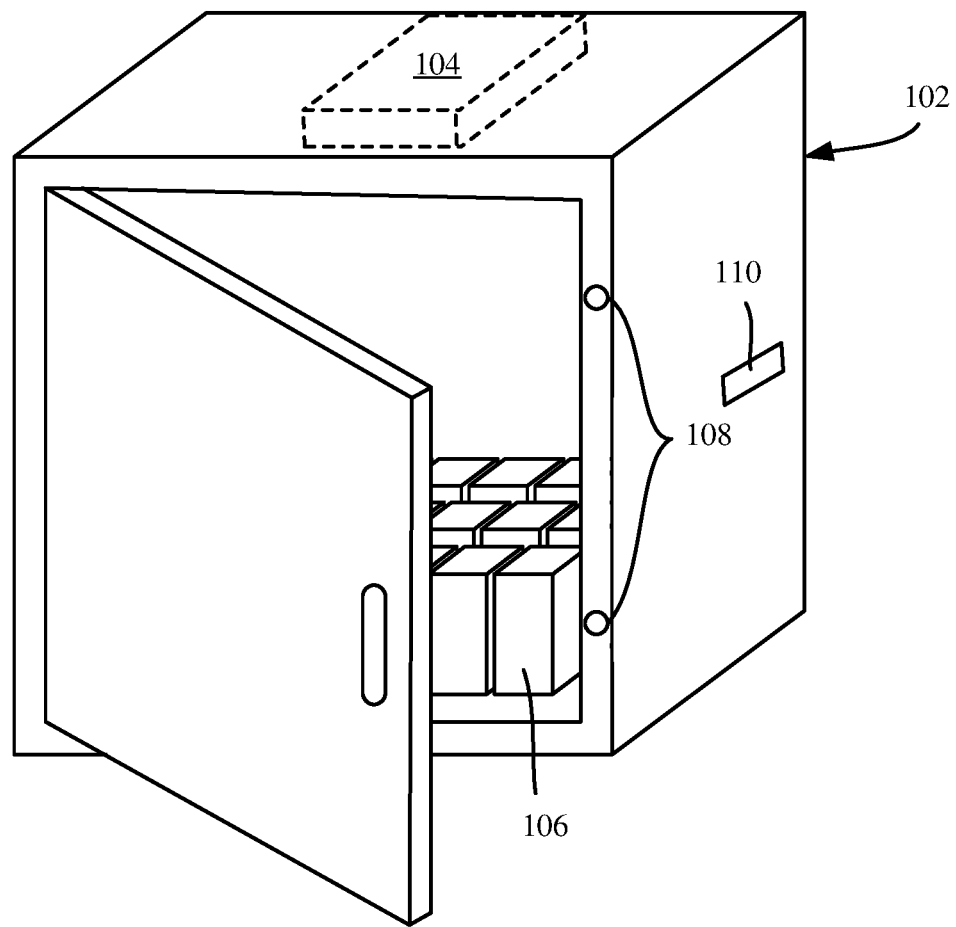
FIG. 1 shows an example container for wireless charging of receiver devices, in accordance with various example embodiments of the subject matter disclosed herein.

FIG. 1 shows an example of a container 102 coupled to a transmitter device 104, such as affixed to the underside of the container's top portion. As described herein, one or more receiver devices 106 are wirelessly charged via the transmitter device 104. Charging takes place when one or more sensors 108 detect that the container 102 is in a closed state, that is, sealed with respect to preventing external emission of the charging signals sent from the transmitter device 104. Charging stops when the one or more sensors 108 detect that the container 102 is in an open state, such as depicted in FIG. 1.

In one implementation, control/monitoring circuitry in the container 102 is coupled to an external interface 110. The external interface 110 can be, for example, a physical coupling such as an Ethernet port that allows an external device such as a computer, smartphone, tablet, dedicated hardware or the like to be coupled to circuitry in the container. Alternatively, or in addition to a physical coupling, as another example the external interface 110 can comprise an antenna.

As yet another example, the external interface 110 can be an RF "window" that passes certain communication frequency signals but blocks the frequency or frequencies (e.g., within a defined frequency range or ranges) used by the transmitter device 104 for charging the devices 106. For example, a system may incorporate a quarter wavelength choke, which may contain a notch out communication frequency to facilitate an RF link. The container, for example, can be RF shielded except at this specific communication window. Such a notch out frequency can be active or passive, that is, turn on or off the choking and/or provide a configurable choke. Such frequency filtering windows can allow communication with receiver devices, as well as the transmitter/controller.

By way of a practical example, consider recharging asset tracking tags within a semi-trailer distribution center. A typical asset tracking use case features (on the order of) hundreds of portable GPS trackers that are used to track semi-trailers in large distribution centers, where semi-trailers are often misplaced. For long-term use cases, repetitive charging of such GPS trackers is needed. The use of wired charging for such a large quantity of GPS trackers is not practical or cost effective, e.g., given the work constraints of the semi-trailer check-in staff. Instead, the technology described herein allows a user to simply place electronic devices in need of recharging in a suitable container as described herein, and shut the container's access door or doors to start charging the devices. The user does not need to check for alignment with a charging pad, or correctly plugged-in wired charging harnesses or the like. Removing charged devices is as simple as opening the container and removing the devices after a sufficient recharging time.

In the scenario of providing a wireless power to GPS trackers for semi-trailers, one typical system of operation involves trackers being placed on semi-trailers at a designated station. When the semi-trailer returns to the designated station, the GPS tracker is removed and transitioned to the charging container for wireless charging. Additional trackers can be removed for GPS tracking, or placed in the wireless charging container for wireless charging on an as-needed basis. A system described herein can support the battery state of charge needs for a deployment of thousands of GPS trackers from a single wireless charging container.

The technology described herein addresses electronic devices that need frequent charging, as well as electronic devices that need infrequent charging. Other use case examples thus include electronic shelf labels that need charging on approximately a yearly basis, consumer wearables that need charging on a nightly basis, and Internet of Things (IoT) devices (industrial or consumer focuses) that need charging on an as-needed basis. The technology described herein allows any electronic device incorporating a wireless power receiver and accompanying circuitry, such as provided by Ossia® Inc.'s Cota® technology, to be charged, and as described herein, is not limited to charging a single type of device in the container. Indeed, the technology provides an IoT solution that allows mass, simultaneous charging of multiple IoT devices, without the need for wires, cables, charging pads, or specific placement orientation, and can be customized to fit other IoT charging solutions, e.g., in any supply chain.

Figure 2:
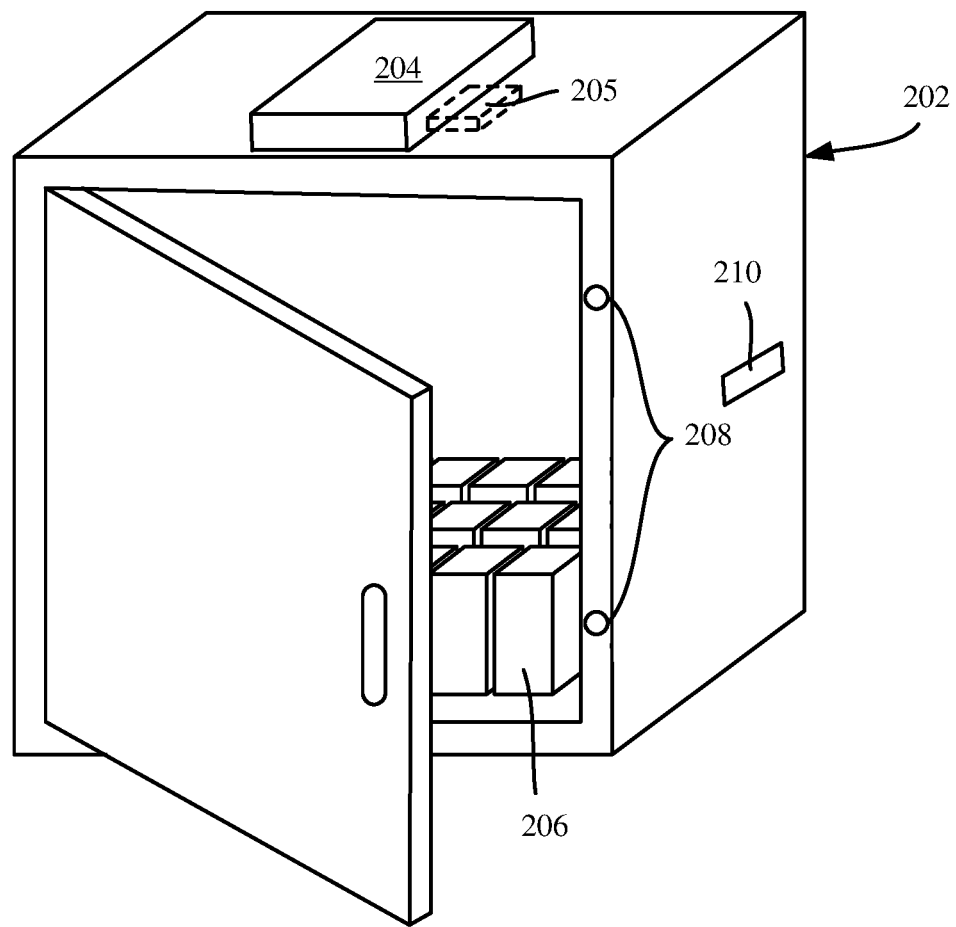
FIG. 2 shows an example container including externally mounted circuitry for wireless charging of receiver devices, in accordance with various example embodiments of the subject matter disclosed herein.

FIG. 2 shows an embodiment in which transmitter circuitry 204 is externally mounted atop a container 202, with a waveguide 205 inside the container, e.g., affixed to the underside of the container's top. Note that the size of the depicted transmitter circuitry 204 relative to the size of the waveguide 205 (and/or to the container itself) is not intended to convey actual sizes, as indeed, the circuitry can be smaller than the waveguide, the container can be very large relative to both, and so on. Although for purposes of illustration the waveguide 205 is shown partially beneath the transmitter circuitry 204, the waveguide can be located anywhere that facilitates charging of the devices 206, such as entirely beneath the transmitter circuitry 204. Similarly, the transmitter circuitry 204 can be located anywhere external to the container, and not necessarily mounted thereto, as long as appropriate electrical coupling to the waveguide 205 can be achieved.

Figure 3:
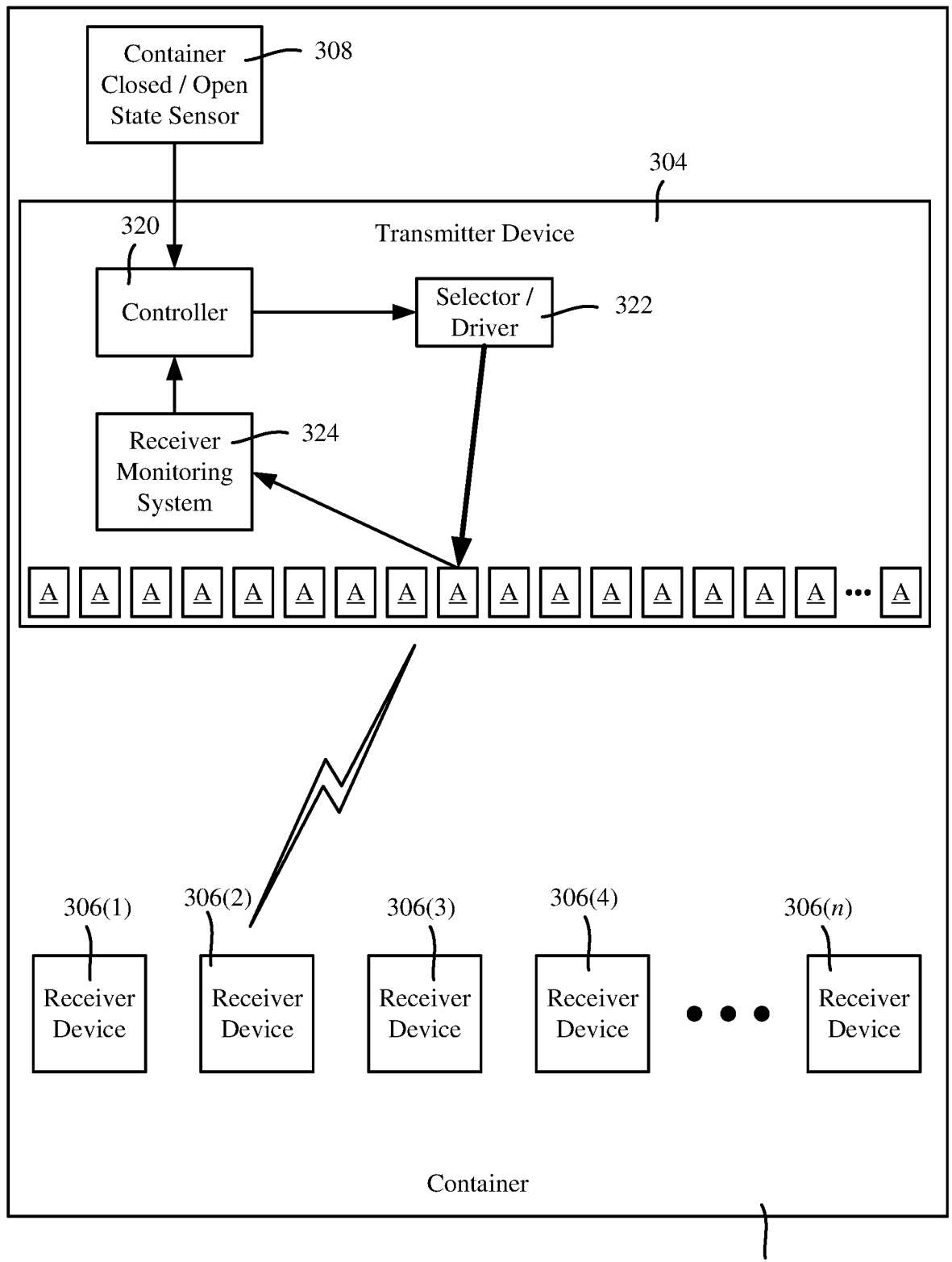
FIG. 3 shows example components of a container that includes wireless power transmitter and antenna elements for charging receiver devices, in accordance with various example embodiments of the subject matter disclosed herein.

As shown in FIG. 3, the technology provides an enclosed environment such as an EM shielded container 302 for wirelessly charging wireless charging-enabled receiver devices, exemplified as receiver devices 306(1)-306(n). Based on detection by a suitable sensor 308, the depicted transmitter device 304 stops the wireless charging output signals when a user opens the container door(s) to deposit or retrieve one or more of the receiver devices 306(1)-306(n), and resumes wireless power charging after the container door(s) are closed. Because of the EM-sealed container, charging power output can be relatively large compared to open space charging where exposure to humans is a limiting factor in power level. As shown in the example of FIG. 3, in one or more implementations, the closed/open state sensor 308 can be coupled to a controller 330 that controls whether the transmitter device 304 transmits wireless output power signals.

One or more of the receiver devices 306(1)-306(n) can be selectively charged at a time as described herein. For example, based on the states of respective devices' charges, a device (e.g., 306(2)) such as the one most in need of charging is selected for charging via a selector/driver 322 by one or more of the transmitter device's antennas (an array of antennas, each antenna labeled "A" in FIG. 3 is depicted). When the container 302 is in the closed state with respect to transmitting wireless power signals, the controller 320 can determine which antenna or antennas of the array are selected based on receiver information obtained via a receiver monitoring system 324. The system is thus able to "move" the standing wave for "no dead" locations, in comparison to a magnetron, for example, with a fixed standing wave pattern. The system facilitates more efficient use of RF energy in a closed space; whatever RF energy transmitted that is not absorbed by receiver devices is impinged back on the transmitter antenna. The system can sense the amount of power being received by receiver devices and use this information to maximize power that is directed to rectifiers. As the power received by clients increases or decreases, the harmonics back-radiation (emissions at multiples of the fundamental frequency) from the clients will also respectively increase or decrease due to non-linear mechanism behind RF-to-DC rectification. This information can be used to optimize the total power delivered to clients. The system is thus able to select and attempt to optimize which receiver device or devices are receiving power.

In the example of FIG. 3, the receiver device 306(2) is receiving the transmitted power, such as over an RF signal. The antennas also can be used to communicate data, e.g., every 1.0 second there can be 0.9 seconds of power output signaling, and 0.1 seconds of communication signals. It is also feasible to charge the receiver devices at one frequency and communicate data to and from the devices at a different frequency, with adequate frequency separation to avoid interference and the like. Thus, the receiver monitoring system can collect information of the receiver devices.

For example, via closed loop control, the controller 320 can obtain each receiver's state of charge, and can determine which antenna or antennas of the array best couples to the receiver devices corresponding to the receiver devices' respective locations. This means that a receiver device can be located anywhere in the container, provided such a device is not overly blocked from power signal reception (and communication transmissions) by something in the container, such as another receiver device or devices. Indeed, receiver devices can move within the container, such as if entered into the container on a conveyor belt or the like in which devices needing recharging are placed on the conveyor belt (possibly automatically), charged while moving, and then exiting. In other embodiments, placement of the devices inside can include device-specific cradles, a magnetic mounting board, hanging racks, and so forth. In any event, the specific placement and orientation of the devices is considerably less sensitive to accuracy and repeatability when compared to resonant coupling, inductive coupling, or wired cable harnesses.

The container can provide an opening similar to a mailbox door access for dropping in receiver device clients. In one implementation, this can be like a vending machine that drops out charged clients. A robotic storage system similar to an automated parking structure can be provided to accept, catalog, prioritize charging, and/or distribute electronic receiver devices. This can provide a non-RF leaking depositing and/or dispensing system.

With respect to a vending machine, a commercial vending machine can comprise a container sealed that charges devices inside when sealed; (for example, such vending machines at an airport or the like sell or rent USB charger devices, headphones, while stores sell thermometers and other electrical devices that are maintained in a more secure location to prevent theft). A glass front on the container can create a shopping experience by which potential buyers and/or renters can see inside. As a user wants an already charged device, e.g., at an eighty percent healthy state of charge, the wireless charging elements of the container ensures devices are properly charged.

Similarly, devices that need charging can be charged in a commercial environment. A user can charge a device at an airport, shopping mall and so forth, via a rented container with a locking keypad, actual lock and/or the like. Thus, a system as described herein can act as a security locker for storing and charging devices in unsecure locations, with the use of security keys or PIN codes to access the container's internal charging environment.

Based on the communications and the receiver monitoring, the system described herein can monitor the information about the client receiver devices inside the container, (in contrast to "unmonitored" or "open-loop" wireless energy systems). For example, the system is able to measure and track how many client receiver devices are located inside the container, as well as the types of receiver devices. Such a smart system as described herein can provide inventory tracking of receiver charge, to assist with taking charged receivers. Receiver devices can communicate only information deemed "critical" when located in the field, and store other data such that when a receiver device returns to the charging container the other data is uploaded to become available to system users.

The receiver device client design can provide protection from high power RF; for example if Bluetooth® is incorporated, the client can protect against damage. The receiver device client can comprise charging enclosures that shield damaging RF.

The system can incorporate automatic failure detection and/or state detection of the receiver devices, such as (but not limited to) any devices not charging, any damaged devices, device placement, whether a device needs a firmware or software update, whether a receiver device battery has a low state of health and should be replaced, and so on. The system can also monitor other elements of the container, such as (but not limited to) door sealing failure, environmental failure, system damage and/or system hacking, non-wireless charging-capable devices that are present in the container, and so on.

Note that in the example of FIG. 3, the controller 320, selector/driver 322 and receiver monitoring system 324 are shown as separate components that are each incorporated into the transmitter device 304. However, this is only one example implementation; in alternative implementations, the controller can, for example, include the receiver monitoring logic that collects the receiver data, can include the selection logic, and so on. Any of these components can be separate from and coupled to the transmitter device, for example. Indeed, any components of the example transmitter device of FIG. 3 can be independent, can be merged together, or can be further separated into additional components.

Figure 4:
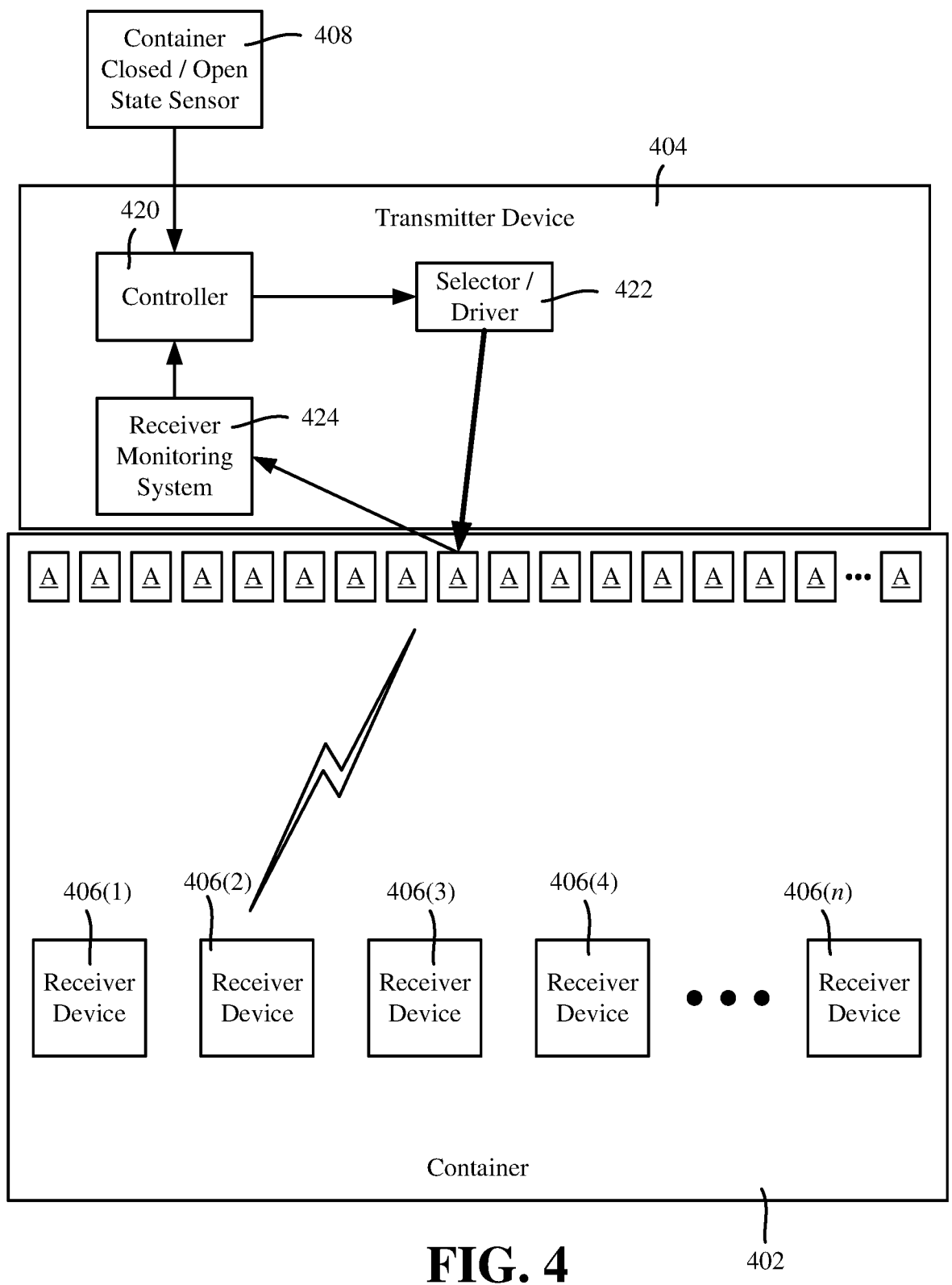
FIG. 4 shows example components of a container that includes antenna elements coupled to an external wireless power transmitter for charging receiver devices, in accordance with various example embodiments of the subject matter disclosed herein.

Further, FIG. 4 shows a system 400 that is similar to FIG. 3, however in FIG. 4 only the antennas A are inside the container 402. The other charging circuitry, represented by the transmitter device 404 and comprising the controller 420, the selector/driver 422 and the receiver monitoring system 424 is external to the container 402, e.g., mounted thereto. Note that FIG. 4 is only one non-limiting example, and part of the circuitry/transmitter device can be external to the container, with part of the circuitry/transmitter device internal to the container.

Figure 5:
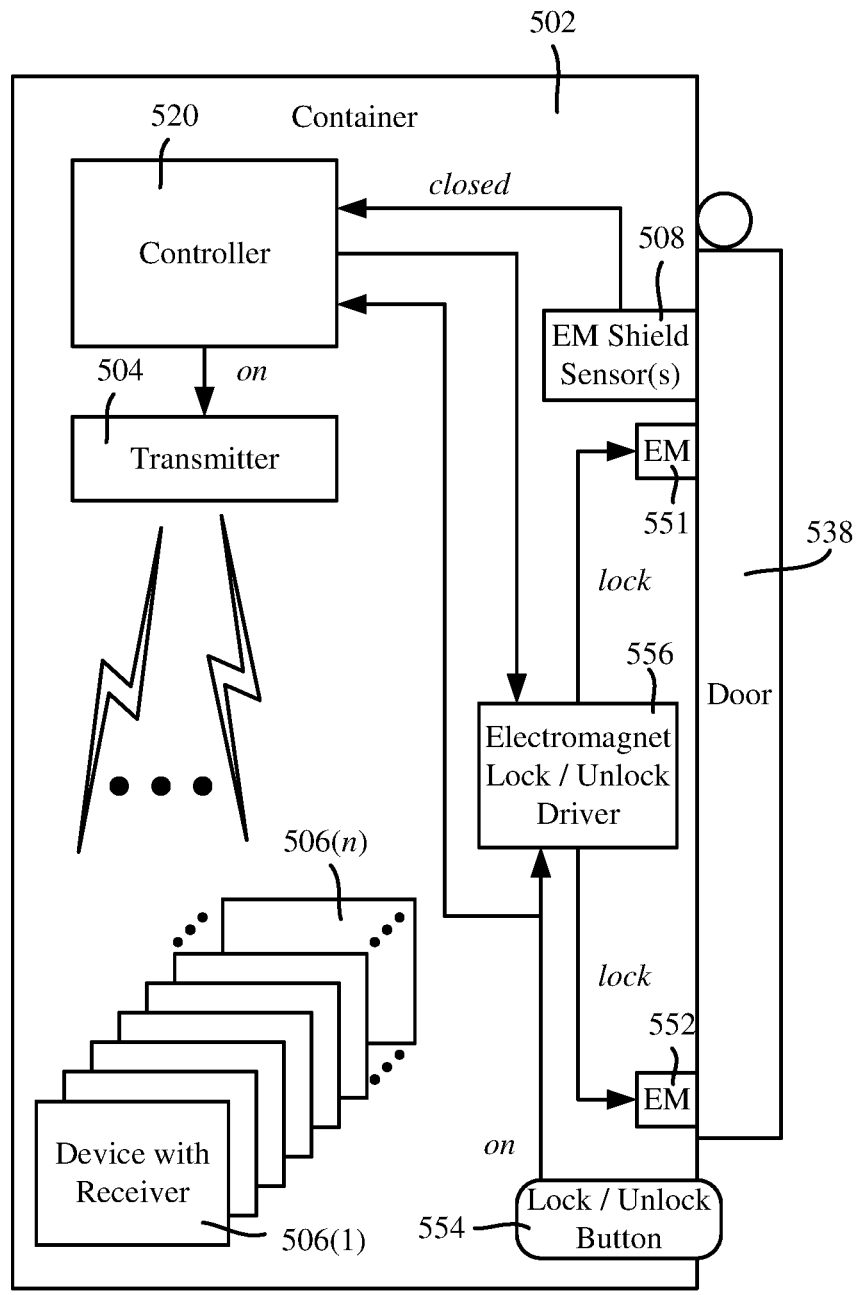
FIGS. 5 and 6 show an example of a lockable container in a closed state (FIG. 5) and an open state (FIG. 6), in which the housing contains a wireless power transmitter and receiver devices, in accordance with various example embodiments of the subject matter disclosed herein.
Figure 6:
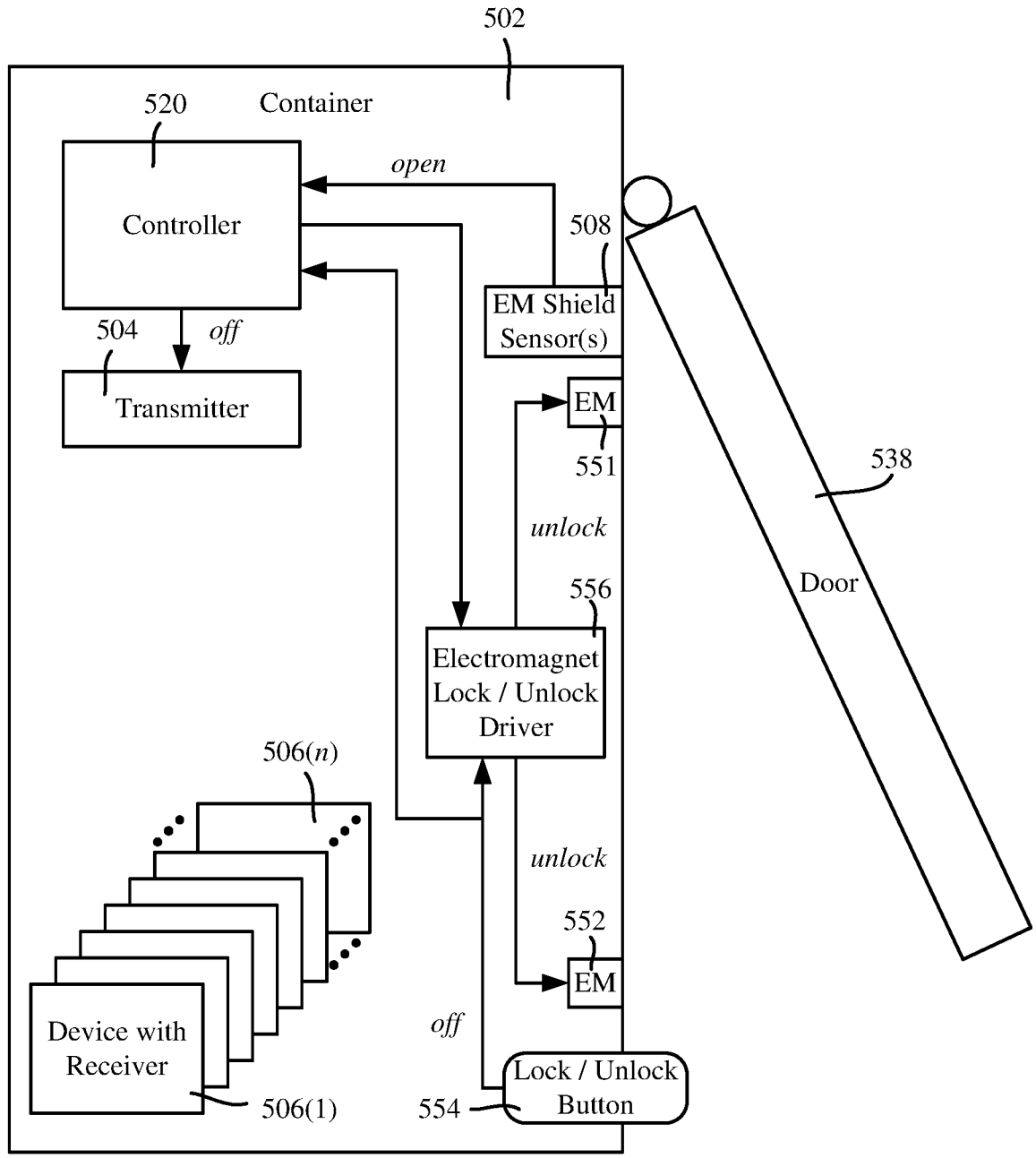

FIGS. 5 and 6 are directed towards locking a container 502, in which electromagnets 551 and 552 lock the container 502. Although two such electromagnets 551 and 552 are depicted, it is understood that in alternative implementations using electromagnets for locking, a single electromagnet up to any practical number may be used. Moreover, if locking is desired, any locking mechanism may be used instead of or in addition to electromagnet-based locking. Note that in FIGS. 5 and 6, the controller 520 and transmitter 504 are shown internal to the container, however this is a non-limiting example, and one or more of such components (as in FIGS. 2 and 4) can be external to the container 502, with only the waveguide/antenna elements in the EM shielded container.

In the example of FIGS. 5 and 6 and in general, a lock/unlock switch 554 coupled to a suitable driver 556 (e.g., a relay or the like) can be used to lock the container 502 with respect to charging the devices 506(1)-506(n). While the switch 554 is depicted as a button in FIGS. 5 and 6, any mechanism that can suitably change state, including a remote control switch, keypad and/or PIN/code, toggle switch and so forth can be used to energize the electromagnet(s) to lock and de-energize the electromagnet(s) to unlock the container door(s) 538. In general, however, a desirable switch is one based on convenience/ease of use, as well as durability. Weatherproofing can also be a factor, depending on where the container is intended to be used. Tamperproof/tamper resistant switches can be used ensure the doors are fully closed and the EM (e.g., RF) seal is engaged prior to providing wireless power to the devices inside. As a failsafe, removing power (e.g., by unplugging the container from a power source) could de-energize the electromagnet(s) and allow the door to be opened.

By way of example, consider an RF charging signal. An RF shielded container is thus used, which can achieve RF shielding with similar approaches to existing RF chambers or microwave ovens. This can include mechanical RF seals, RF absorbers, and specifically designed RF chokes.

Achieving the RF seal may include the use of electromagnets to engage the RF seals and allow for release with the touch of a button. By reversing the polarity of the magnets when a door open request is initiated, the magnets can assist with door opening as well as door closing/sealing. Sealing can be achieved with the simultaneous engagement of switches (e.g., microwave oven-like switches, magnetically coded or coded RFID switches, which engages the electromagnets). Also, the use of an RF choke, in combination with RF absorbing materials may be used to achieve the RF seal between the door(s) and the mating panel of the container.

The shielded container can comprise one or more doors than allows access to the receiver devices located inside. The RF seals on the door may comprise RF seals designs consistent with standard RF shielding chambers such as beryllium copper fingerstock or fabric over foam. The means of achieving the RF seal may include the use of electromagnets to engage the RF seals and allow for release with the touch of a button. As shown in FIGS. 5 and 6, the release of the magnets also signals the transmitter to stop power transmission, allowing for removal or addition of assets to the environment without exposure to the transmitted power of the transmitting device; (although an extra, separate EM shield sensor 508 can be provided for additional safety). Sealing can be achieved with the simultaneous engagement of switches, (e.g., microwave oven switches, magnetically coded or coded RFID switches and the like), which engages the electromagnets.

In one aspect, the RF shielded container allows access to the wireless charging receiver devices inside via a rapid, non-strenuous operation, that is intended to be repeatable many times per day, and have a lifetime of more than N (e.g., 10) years. In comparison to RF sealing chambers commercially available that require mechanical assist (in the form of levers, pneumatic, or hydraulic, electric) to open, the container depicted in FIGS. 5 and 6 provides the ability to open in a simple one-handed operation, again somewhat similar to the approach of a microwave oven. The container can be configured to provide access to the assets inside without the user bending over or straining, and can be mounted on wheels for portability.

Figure 7:
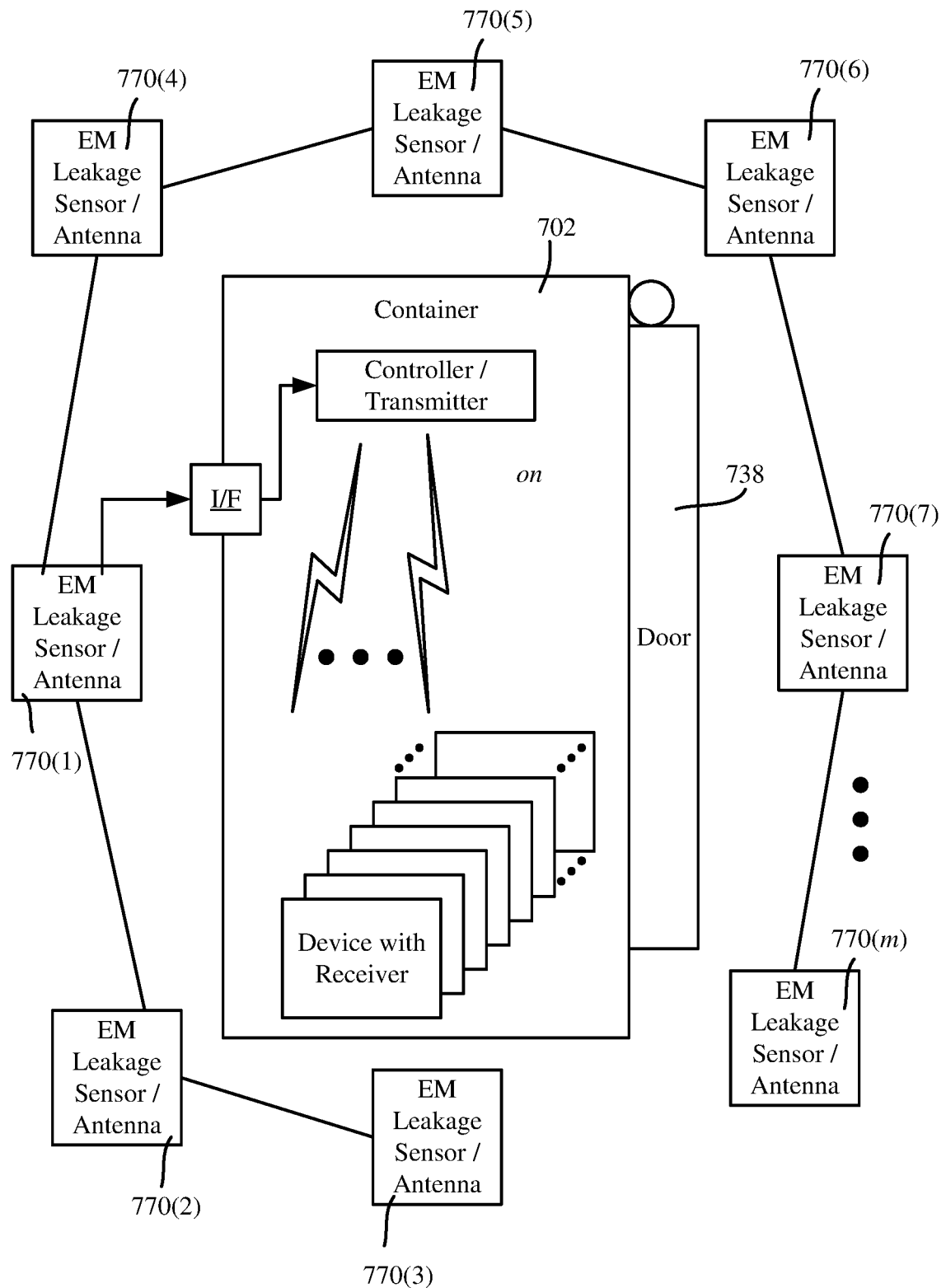
FIG. 7 illustrates an example container in which sensors/antennas are located external relative to a container to detect any electromagnetic radiation leakage corresponding to wireless power charging frequencies, in accordance with various example embodiments of the subject matter disclosed herein.

FIG. 7 shows another alternative aspect, in which one or more EM leakage sensors or sensor antennas 770(1)-770(m) can be positioned external to a container 702, particularly, but not necessarily, proximate the door 738 or other opening/window/welded corner or the like where EM radiation would most likely escape. Such leakage detection sensors/antenna(s) can be calibrated for what is considered allowable leakage. Note that in FIG. 7 the controller and transmitter are shown internal to the container 702, however this is a non-limiting example, and one or more of such components (as in FIGS. 2 and 4) can be external to the container 702, with only the waveguide/antenna elements in the EM shielded container.

As can be appreciated, although multiple sensors/antennas are depicted in FIG. 7, there can be a single sensor with appropriately positioned antenna(s) coupled thereto, and such a single sensor can be inside the container 702. Such a sensor or sensors/antennas 770(1)-770(m) can include filtering so that only the frequency/frequency range used for charging is detected. In the event wireless charging is occurring, a signal from a sensor (via a wired or wireless interface I/F) that indicates likely leakage of the charging signal shuts off the charging.

Such a system as described herein thus can sense if the RF seal is leaking, including without the use of failsafe switches, and turn the transmit power off. This is only one feasible way to sense if the container door is open. Other ways include power return sensing.

Figure 8:
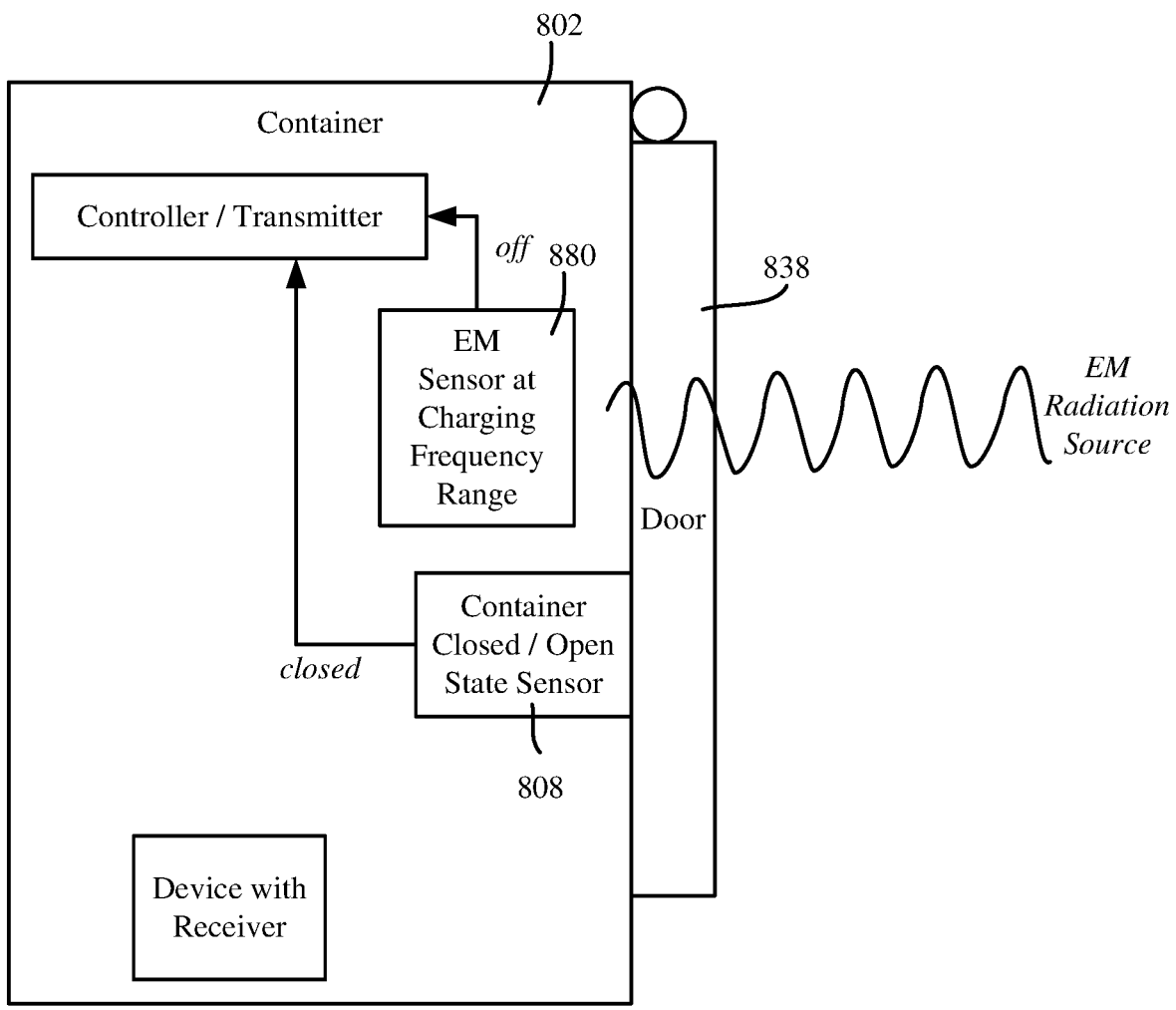
FIG. 8 illustrates an example container in which a sensor is located inside a container to detect any electromagnetic radiation entering the container when sealed and not wireless charging, in accordance with various example embodiments of the subject matter disclosed herein.

In the alternative implementation illustrated in FIG. 8, an EM leakage sensor 880 is inside a container 802. In this example, when the door 838 is closed and charging is off, no frequency corresponding to the charging signals should be detected. If, however, there is a breach in the seal or other opening, then a frequency corresponding to the charging frequency is detected. Note that in FIG. 8 the controller and transmitter are shown internal to the container 802, however this is a non-limiting example, and one or more of such components (as in FIGS. 2 and 4) can be external to the container 802, with only the waveguide/antenna elements in the EM shielded container.

Figure 9:
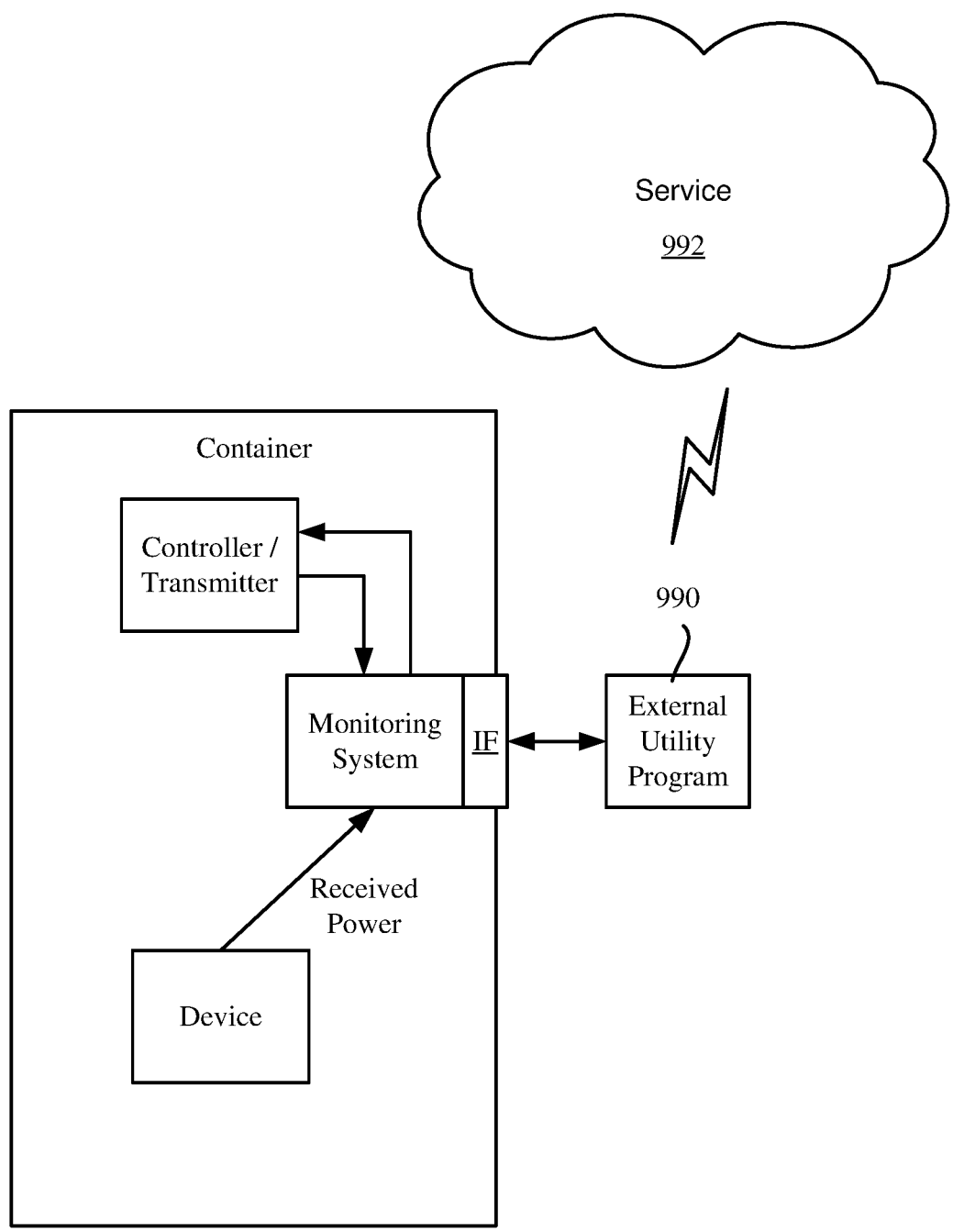
FIG. 9 illustrates an example container configured for external monitoring, in accordance with various example embodiments of the subject matter disclosed herein.

For example, consider that the charging frequency is in the Wi-Fi range, e.g., at about 2.4 GHz or 5.8 GHz; if the door is closed and charging is not yet occurring, then sensing a Wi-Fi signal means that the container 802 is not properly shielded. This can be used for active detection, such as by occasionally turning off charging and checking for an external signal getting in. This also can be used for checking the integrity of a container; e.g., place a sensor inside an otherwise inactive container, seal the container, generate external test signals and determine if the sensor picks up the external signals or if they are properly blocked from entering. Notwithstanding this example, a system can be frequency agnostic and can operate in any frequency band, including in Industrial, Scientific, and Medical (ISM) bands and non-ISM bands, as well as in non-RF frequencies such as visible light, infrared, ultraviolet and so on, As shown in FIG. 9, a system can be controlled and monitored through an external utility program 990, e.g., the Cota® Desktop Utility (DTU) interface, which tracks the received power and charging status of Cota®-enabled power receiver devices. In this way, for example, such a system can be monitored and controlled through a GUI or other suitable interface that tracks statistics about the transmitters and receivers. This allows a user to determine when a receiver device is sufficiently charged, without prematurely having to open the container. An external utility program can also be used to control the transmitter to an extent, such as to ensure that the transmitter is operating correctly. Further, the user can set the desired charge level, e.g., eighty percent (as certain types of batteries last longer when not charged beyond a certain percentage). The external utility program 990 can be coupled to a cloud service 992, for example, for remote management and monitoring of the container elements and/or the receiver devices inside A transparent opening (e.g., to visible light but opaque to RF, at least at the charging frequency or frequencies) or the like also can be provided to view the inside of the container. For example, consider that a receiver device includes an LED that changes color when charged to the desired level. A user can view the receiver device's state of charge via the LED without having to open the container. To summarize, wireless power devices may include an indicator, such as an LED, to highlight sufficient battery state of charge to users; LEDs can display the state of charge status all at once, or specific devices can be triggered to light up individually.

The system also can incorporate an (e.g., RF safe) camera inside the container for monitoring devices and user interactions. For large (e.g., walk-in) containers, a motion sensor or the like can be used to turn off charging when motion indicative of a person is sensed, in case the person is inside the container when the door is closed.

The container can be portable, plugged into a power source, and/or can be coupled to a solar power source (panels, battery, circuitry) that allows remote usage away from an electrical outlet or the like. A system can incorporate a solar panel on the box, for example, for providing wireless power in off grid settings. The system can include an uninterruptable power supply (UPS) to provide power during times of power outage. A system can include power filtering to ensure the system can receive power from inconsistent power sources One or more aspects can be in a system, and/or can comprise example operations, such as operations performed in a method, or a processor and a memory that stores executable instructions that, when executed by the processor, facilitate performance of the example operations, or a machine-readable medium, comprising executable instructions that, when executed by a processor, facilitate performance of the example operations. A process of producing or operating any system element can be provided.

An example of such a system can comprise a wireless power transmitter device configured to transmit wireless charging output to a wireless power receiver device within a container, wherein the container comprises an electromagnetically shielded enclosure with respect to the wireless charging output when the container is in a closed state. The system can further comprise a controller coupled to the wireless power transmitter device, the controller controlling the output power state of the wireless power transmitter device. The system can further comprise a sensor that detects whether the container is in the closed state, the sensor communicatively coupled to the controller to indicate whether the container is in the closed state, wherein, in response to the sensor indicating that the container is in the closed state, the controller controls the transmitter to transmit the wireless charging output to the receiver device.

The sensor can detect whether a container door is open.

Aspects can comprise an electromagnetic locking device that locks the container to establish the closed state.

The sensor can detect at least one of: whether electromagnetic radiation corresponding to the wireless charging output from the transmitter is detected external to the container when the container is in the closed state, or whether electromagnetic radiation corresponding to the wireless charging output from the transmitter device is detected internal to the container at a time that the wireless power transmitter device is not transmitting.

The container can be incorporated into a machine, the machine configured to dispense the receiver device when the receiver device has reached a defined state of charge level.

The container can be incorporated into a vending machine, the vending machine configured to dispense the receiver device in response to purchase or rental.

The controller can obtain a state of charge from the receiver device, and select the receiver device for charging via the wireless charging output based on the state of charge level.

The receiver device can include one of a group of receiver devices within the container; the controller can select the receiver device for charging via the wireless charging output based at least in part on round robin selection.

The receiver device can include a first receiver device of a group of receiver devices within the container; the controller charges the first receiver device via the wireless charging output in parallel or substantially in parallel with charging a second receiver device of the group via the wireless charging output.

The wireless charging output can be transmitted at a first portion of a timeframe to the receiver device, and a second portion of the timeframe can facilitate communication with the receiver device.

Further aspects can include at least one of: an antenna coupled to an exterior of the container to facilitate communication with a component in the container when the container is in the closed state, an interface port coupled to an exterior of the container to facilitate communication with a component in the container when the container is in the closed state, a communication window comprising a portion of the controller that allows radio frequency communication with the controller, in a frequency range that is different from a frequency range of the wireless charging output, to facilitate communication with a component in the container when the container is in the closed state, or an interface coupled to the container that facilitates communication between a first component within the container and a second component external to the container.

The controller can perform at least one of: failure detection of the container, or failure detection of the receiver device.

The container can be coupled to obtain power via at least one of: an uninterruptable power supply, or an integrated photovoltaic panel.

At least part of the container can be transparent to visible light.

Figure 10:
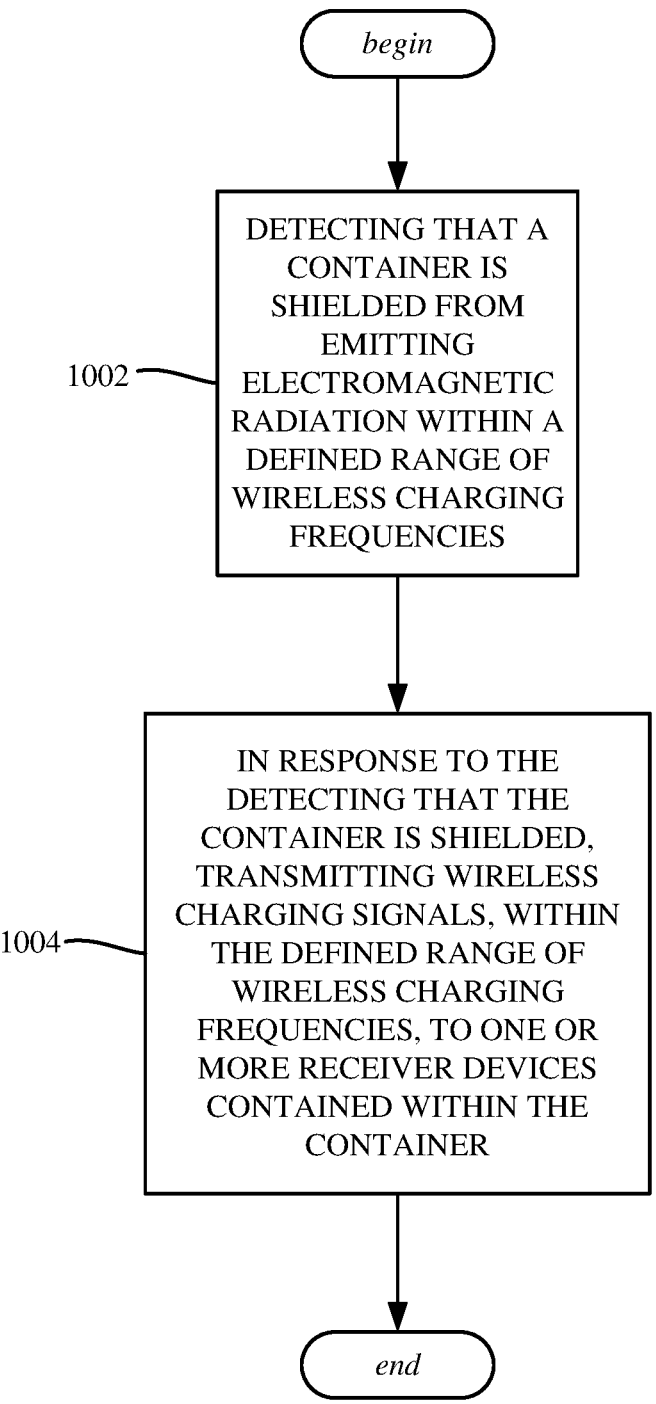
FIG. 10 shows example operations corresponding to wireless charging based on a container being in a shielded state with respect to outputting charging signals, in accordance with various example embodiments of the subject matter disclosed herein.

One or more aspects are represented in FIG. 10, and can comprise example operations, such as of a processor and a memory that stores executable instructions or components, that, when executed by the processor, facilitate performance of the example operations. Example operation 1002 represents detecting that a container is shielded from emitting electromagnetic radiation within a defined range of wireless charging frequencies.

Example operation 1004 represents, in response to the detecting that the container is shielded, transmitting wireless charging signals, within the defined range of wireless charging frequencies, to one or more receiver devices contained within the container.

A first receiver device and a second receiver device can be contained within the container, and further operations can comprise charging the first receiver device during a first charging time and charging the second receiver device during a second charging time.

A first receiver device and a second receiver device can be contained within the container, and further operations can comprise selecting the first receiver device for charging based on a first state of charge of the first receiver device relative to a second state of charge of the second receiver device.

Figure 11:
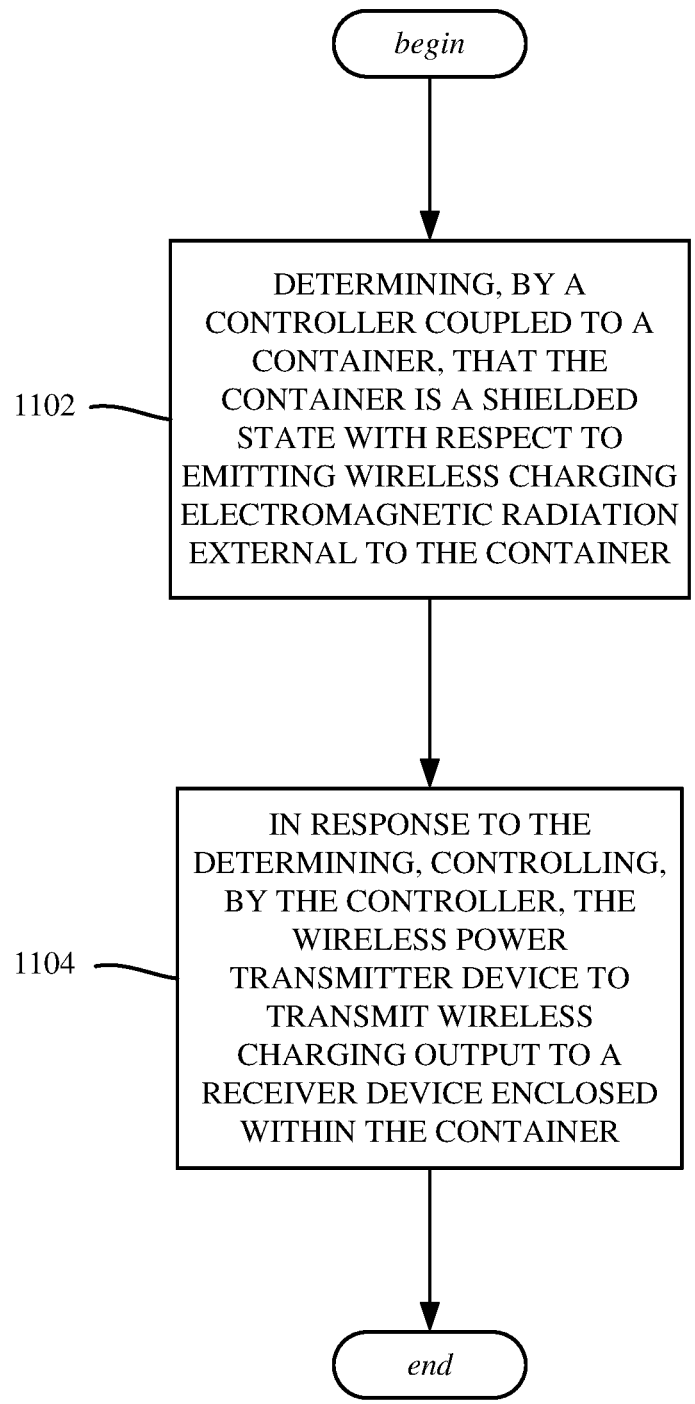
FIG. 11 shows example operations corresponding to controlling a wireless power transmitter device to transmit wireless charging output to a receiver device enclosed within an electromagnetic radiation shielded container, in accordance with various example embodiments of the subject matter disclosed herein.

One or more aspects are represented in FIG. 11, and can include example operations, such as of a method. Example operation 1102 represents determining, by a controller coupled to a container, that the container is a shielded state with respect to emitting wireless charging electromagnetic radiation external to the container. Example operation 1104 represents, in response to the determining, controlling, by the controller, the wireless power transmitter device to transmit wireless charging output to a receiver device enclosed within the container.

Determining that the container is a shielded state can include receiving, by the controller, sensor data.

Further operations can include obtaining, by the controller, state of charge information associated with the receiver device, and communicating, by the controller, the state of charge information to a receiving entity.

The sensor can detect whether electromagnetic radiation corresponding to the wireless charging output from the transmitter can be detected external to the container when the container can be in the closed state.

The sensor can detect whether electromagnetic radiation corresponding to the wireless charging output from the transmitter device can be detected internal to the container at a time that the wireless power transmitter device is not transmitting.

The receiver device can comprise an RFID tag. The receiver device can comprise a global positioning system tag. The receiver device can comprise a battery housing. The receiver device can comprise a consumer wearable device. The receiver device can comprise an internet of things (IoT) device. The receiver device can comprise an internet of things (IoT) sensor.

The receiver device can communicate a state of charge to the controller, and the receiver device can be selected by the controller for charging via the wireless charging output based on the state of charge level.

The receiver device can be a first receiver device of a group of receiver devices within the container, and the first receiver device can be charged via the wireless charging output in parallel with charging a second receiver device via the wireless charging output. The first receiver device can be charged via the wireless charging output in parallel or substantially in parallel (e.g., rapidly switch between charging the devices during a single charging portion of a timeframe) during a single charging portion with the charging of the second receiver device via the wireless charging output at a same charging frequency. The first receiver device can be charged via the wireless charging output in parallel or substantially in parallel with the charging of the second receiver device via the wireless charging output at a first charging frequency for the first receiver device and a second, different charging frequency for the second receiver device.

The receiver device can comprise an output indicator that indicates that the receiver device has reached a defined state of charge level.

The wireless charging output can be transmitted at a radio frequency. The wireless charging output can be transmitted at an infrared, visible light, and/or ultraviolet frequency band. The wireless charging output can be transmitted at a first portion of a timeframe to the receiver device, and a second portion of the timeframe can facilitate communication with the receiver device.

The wireless charging output can be transmitted at a first frequency to the receiver device, and at least one of the transmitter device or the controller communicates with the receiver device via a second frequency that can be different relative to the first frequency.

Aspects can comprise a camera within the container.

The container can be openable via a code.

The controller can track the state of the receiver device.

The receiver device can be a first receiver device of a group of receiver devices within the container, and the controller can track the state of the group of receiver devices within the container receiver devices.

The controller can operate to more optimally have power transmitted by the transmitter device based on total power.

The controller can perform failure detection of the container.

The controller can perform failure detection on the receiver device.

The container can be coupled to an uninterruptable power supply.

The container can be coupled to a solar device that collects light energy and converts the light energy to power.

The receiver device can be insertable into the container, and/or retractable from the container, via a robotic device.

The receiver device can be removable from the container via a robotic device.

A first receiver device and a second receiver device can be contained within the container, and further operations can comprise charging the first receiver device and charging the second receiver device in parallel or substantially in parallel.

A first receiver device and a second receiver device can be contained within the container, and further operations can comprise charging the first receiver device and charging the second receiver device in parallel or substantially in parallel at a same charging frequency. Multiple devices can be charged in parallel.

A first receiver device and a second receiver device can be contained within the container, and further operations can comprise charging the first receiver device at a first charging frequency and charging the second receiver device at a second charging frequency that is different from the first charging frequency.

As can be seen, the technology described herein facilitates wireless device charging in a contained environment that is virtually effortless to operate (in contrast to existing RF chambers that generally require a mechanical advantage to open or close RF chamber doors). Aspects can include an ME (e.g., RF) seal that allows the overall system to pass FCC RF regulations; the RF seal can use mechanical compression-based RF seals, RF absorbers, and/or RF choke designs The doors can comprise any suitable mechanism, such as cabinet style doors that open from a hinged edge section and/or can include an electromagnet locking function. A suitable door hinge can feature two pivot points, for example, which allows the door to evenly seal around the entire perimeter. Forms of automated door actuation, including but not limited to rotating or sliding, are also applicable.

The technology described herein can function as single device in—single device out sequence of operations, as well as "batching" of wireless power devices, where batching refers to gathering wireless power devices in groups of two or more, then placing in the charging container. Similar size batches can also be removed.

The technology described herein can support devices that need infrequent charging as set forth above, or daily charging. Other examples include providing wireless power for automated inventory management containers, which allows users (typically company employees) to retrieve or deposit devices for charging on an as needed basis.

Figure 12:
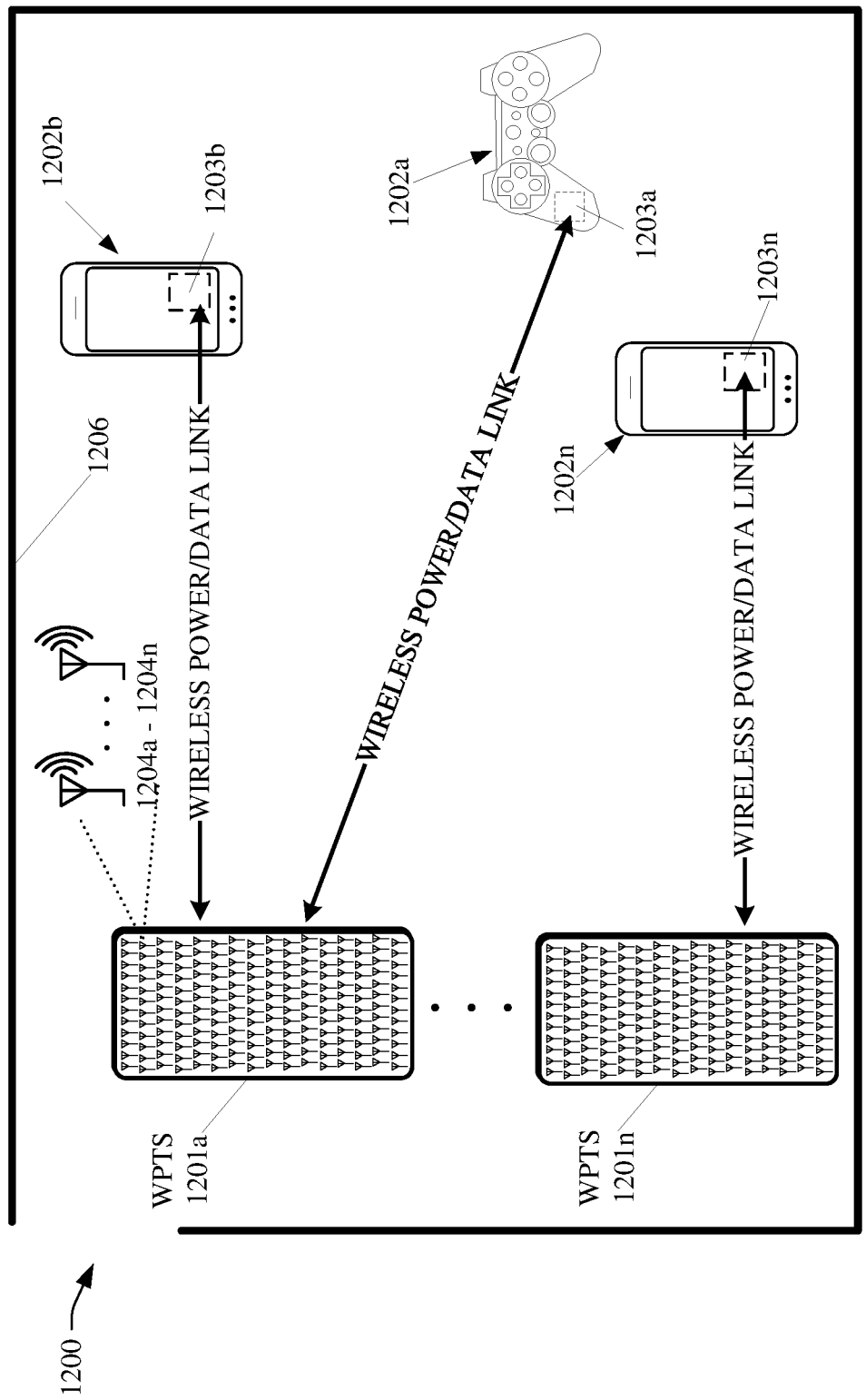
FIG. 12 depicts a block diagram of an example wireless power delivery environment illustrating wireless power delivery from one or more wireless power transmission systems to various wireless devices within the wireless power delivery environment, in accordance with various example embodiments of the subject matter disclosed herein.

FIG. 12 depicts a block diagram including an example wireless power delivery environment 1200 illustrating wireless power delivery from one or more wireless power transmission systems (WPTS) 1201a-n (also referred to as "wireless power delivery systems", "antenna array systems" and "wireless chargers") to various wireless devices 1202a-n within the wireless power delivery environment 1200, according to some embodiments. More specifically, FIG. 12 illustrates an example wireless power delivery environment 1200 in which wireless power and/or data can be delivered to available wireless devices 1202a-1202n having one or more wireless power receiver clients 1203a-1203n (also referred to herein as "clients" and "wireless power receivers"). The wireless power receiver clients are configured to receive and process wireless power from one or more wireless power transmission systems 1201a-1201n. Components of an example wireless power receiver client 1203 are shown and discussed in greater detail with reference to FIG. 15.

As shown in the example of FIG. 12, the wireless devices 1202a-1202n include mobile phone devices and a wireless game controller. However, the wireless devices 1202a-1202n can be any device or system that needs power and is capable of receiving wireless power via one or more integrated wireless power receiver clients 1203a-1203n. As discussed herein, the one or more integrated wireless power receiver clients receive and process power from one or more wireless power transmission systems 1201a-1201n and provide the power to the wireless devices 1202a-1202n (or internal batteries of the wireless devices) for operation thereof.

Each wireless power transmission system 1201 can include multiple antennas 1204a-n, e.g., an antenna array including hundreds or thousands of antennas, which are capable of delivering wireless power to wireless devices 1202a-1202n. In some embodiments, the antennas are adaptively-phased RF antennas. The wireless power transmission system 1201 is capable of determining the appropriate phases with which to deliver a coherent power transmission signal to the wireless power receiver clients 1203a-1203n. The array is configured to emit a signal (e.g., continuous wave or pulsed power transmission signal) from multiple antennas at a specific phase relative to each other. It is appreciated that use of the term "array" does not necessarily limit the antenna array to any specific array structure. That is, the antenna array does not need to be structured in a specific "array" form or geometry. Furthermore, as used herein the term "array" or "array system" may include related and peripheral circuitry for signal generation, reception and transmission, such as radios, digital logic and modems. In some embodiments, the wireless power transmission system 1201 can have an embedded Wi-Fi hub for data communications via one or more antennas or transceivers.

The wireless devices 1202 can include one or more wireless power receiver clients 1203. As illustrated in the example of FIG. 12, power delivery antennas 1204a-1204n are shown. The power delivery antennas 1204a are configured to provide delivery of wireless radio frequency power in the wireless power delivery environment. In some embodiments, one or more of the power delivery antennas 1204a-1204n can alternatively or additionally be configured for data communications in addition to or in lieu of wireless power delivery. The one or more data communication antennas are configured to send data communications to and receive data communications from the wireless power receiver clients 1203a-1203n and/or the wireless devices 1202a-1202n. In some embodiments, the data communication antennas can communicate via Bluetooth™, Wi-Fi_33™, ZigBee™, etc. Other data communication protocols are also possible.

Each wireless power receiver client 1203a-1203n includes one or more antennas (not shown) for receiving signals from the wireless power transmission systems 1201a-1201n. Likewise, each wireless power transmission system 1201a-1201n includes an antenna array having one or more antennas and/or sets of antennas capable of emitting continuous wave or discrete (pulse) signals at specific phases relative to each other. As discussed above, each of the wireless power transmission systems 1201a-1201n is capable of determining the appropriate phases for delivering the coherent signals to the wireless power receiver clients 1202a-1202n. For example, in some embodiments, coherent signals can be determined by computing the complex conjugate of a received beacon (or calibration) signal at each antenna of the array such that the coherent signal is phased for delivering power to the particular wireless power receiver client that transmitted the beacon (or calibration) signal.

Although not illustrated, each component of the environment, e.g., wireless device, wireless power transmission system, etc., can include control and synchronization mechanisms, e.g., a data communication synchronization module. The wireless power transmission systems 1201a-1201n can be connected to a power source such as, for example, a power outlet or source connecting the wireless power transmission systems to a standard or primary AC power supply in a building. Alternatively, or additionally, one or more of the wireless power transmission systems 1201a-1201n can be powered by a battery or via other mechanisms, e.g., solar cells, etc.

The wireless power receiver clients 1202a-1202n and/or the wireless power transmission systems 1201a-1201n are configured to operate in a multipath wireless power delivery environment. That is, the wireless power receiver clients 1202a-1202n and the wireless power transmission systems 1201a-1201n are configured to utilize reflective objects 1206 such as, for example, walls or other RF reflective obstructions within range to transmit beacon (or calibration) signals and/or receive wireless power and/or data within the wireless power delivery environment. The reflective objects 1206 can be utilized for multi-directional signal communication regardless of whether a blocking object is in the line of sight between the wireless power transmission system and the wireless power receiver clients 1203a-1203n.

As described herein, each wireless device 1202a-1202n can be any system and/or device, and/or any combination of devices/systems that can establish a connection with another device, a server and/or other systems within the example environment 1200. In some embodiments, the wireless devices 1202a-1202n include displays or other output functionalities to present data to a user and/or input functionalities to receive data from the user. By way of example, a wireless device 1202 can be, but is not limited to, a video game controller, a server desktop, a desktop computer, a computer cluster, a mobile computing device such as a notebook, a laptop computer, a handheld computer, a mobile phone, a smart phone, a PDA, a Blackberry device, a Treo, and/or an iPhone, etc. By way of example and not limitation, the wireless device 1202 can also be any wearable device such as watches, necklaces, rings or even devices embedded on or within the customer. Other examples of a wireless device 1202 include, but are not limited to, safety sensors (e.g., fire or carbon monoxide), electric toothbrushes, electronic door lock/handles, electric light switch controller, electric shavers, etc.

Although not illustrated in the example of FIG. 12, the wireless power transmission system 1201 and the wireless power receiver clients 1203a-1203n can each include a data communication module for communication via a data channel. Alternatively, or additionally, the wireless power receiver clients 1203a-1203n can direct the wireless devices 1202a-1202n to communicate with the wireless power transmission system via existing data communications modules. In some embodiments, the beacon signal, which is primarily referred to herein as a continuous waveform, can alternatively or additionally take the form of a modulated signal.

Figure 13:
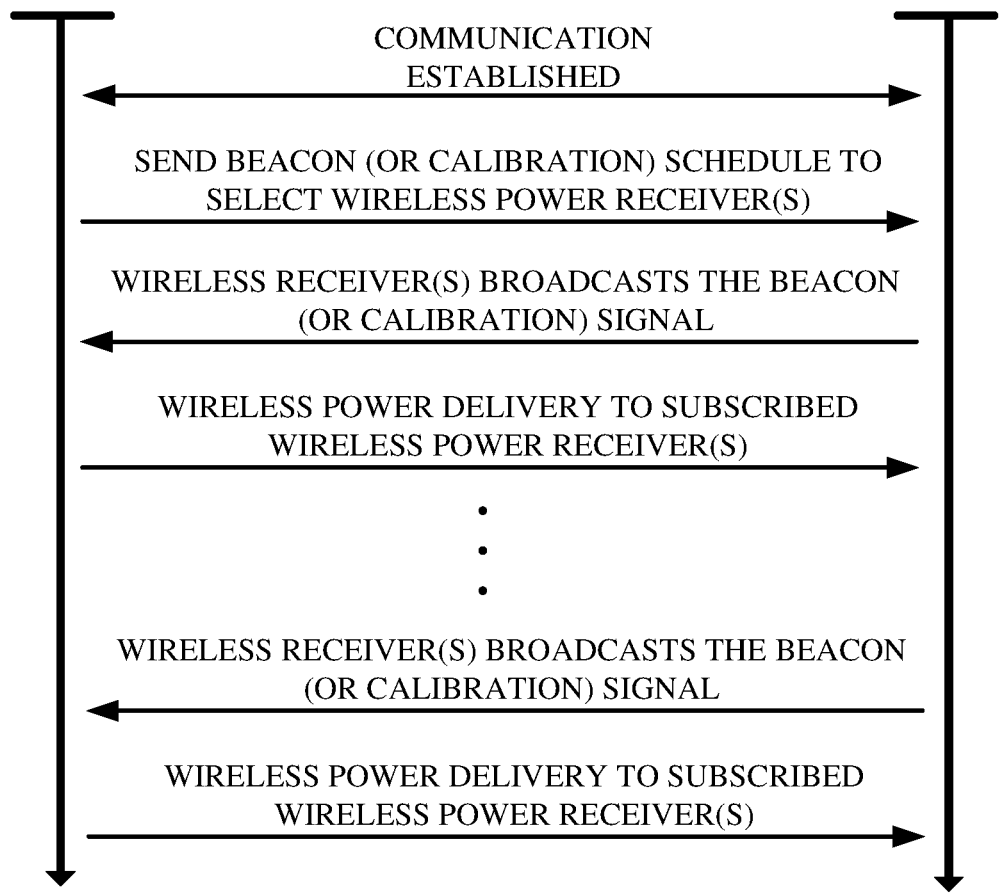
FIG. 13 depicts a sequence diagram illustrating example operations between a wireless power transmission system and a wireless power receiver client for commencing wireless power delivery, in accordance with various example embodiments of the subject matter disclosed herein.

FIG. 13 depicts a sequence diagram 1300 illustrating example operations between a wireless power delivery system (e.g., wireless power transmission system 1201 of FIG. 12) and a wireless power receiver client (e.g., FIG. 15) for establishing wireless power delivery in a multipath wireless power delivery, according to an embodiment. Initially, communication is established between the wireless power delivery system and the power receiver client. The initial communication can be, for example, a data communication link that is established via one or more antennas (e.g., 1204a-1204n) of the wireless power transmission system. As discussed, in some embodiments, one or more of the antennas can be data antennas, wireless power transmission antennas, or dual-purpose data/power antennas. Various information can be exchanged between the wireless power transmission system and the wireless power receiver client over this data communication channel. For example, wireless power signaling can be time sliced among various clients in a wireless power delivery environment. In such cases, the wireless power transmission system can send beacon schedule information, e.g., Beacon Beat Schedule (BBS) cycle, power cycle information, etc., so that the wireless power receiver client knows when to transmit (broadcast) its beacon signals and when to listen for power, etc.

Continuing with the example of FIG. 13, the wireless power transmission system selects one or more wireless power receiver clients for receiving power and sends the beacon schedule information to the selected wireless power receiver clients. The wireless power transmission system can also send power transmission scheduling information so that the wireless power receiver client knows when to expect (e.g., a window of time) wireless power from the wireless power transmission system. The wireless power receiver client then generates a beacon (or calibration) signal and broadcasts the beacon during an assigned beacon transmission window (or time slice) indicated by the beacon schedule information, e.g., BBS cycle. As discussed herein, the wireless power receiver client includes one or more antennas (or transceivers) that have a radiation and reception pattern in three-dimensional space proximate to the wireless device in which the wireless power receiver client is embedded.

The wireless power transmission system receives the beacon from the power receiver client and detects and/or otherwise measures the phase (or direction) from which the beacon signal is received at multiple antennas. The wireless power transmission system then delivers wireless power to the power receiver client from the multiple antennas based on the detected or measured phase (or direction) of the received beacon at each of the corresponding antennas. In some embodiments, the wireless power transmission system determines the complex conjugate of the measured phase of the beacon and uses the complex conjugate to determine a transmit phase that configures the antennas for delivering and/or otherwise directing wireless power to the wireless power receiver client via the same path over which the beacon signal was received from the wireless power receiver client.

In some embodiments, the wireless power transmission system includes many antennas. One or more of the many antennas may be used to deliver power to the power receiver client. The wireless power transmission system can detect and/or otherwise determine or measure phases at which the beacon signals are received at each antenna. The large number of antennas may result in different phases of the beacon signal being received at each antenna of the wireless power transmission system. As discussed above, the wireless power transmission system can determine the complex conjugate of the beacon signals received at each antenna. Using the complex conjugates, one or more antennas may emit a signal that takes into account the effects of the large number of antennas in the wireless power transmission system. In other words, the wireless power transmission system can emit a wireless power transmission signal from one or more antennas in such a way as to create an aggregate signal from the one or more of the antennas that approximately recreates the waveform of the beacon in the opposite direction. Said another way, the wireless power transmission system can deliver wireless RF power to the wireless power receiver clients via the same paths over which the beacon signal is received at the wireless power transmission system. These paths can utilize reflective objects 1206 within the environment. Additionally, the wireless power transmission signals can be simultaneously transmitted from the wireless power transmission system such that the wireless power transmission signals collectively match the antenna radiation and reception pattern of the client device in a three-dimensional (3D) space proximate to the client device.

As shown, the beacon (or calibration) signals can be periodically transmitted by wireless power receiver clients within the power delivery environment according to, for example, the BBS, so that the wireless power transmission system can maintain knowledge and/or otherwise track the location of the power receiver clients in the wireless power delivery environment. The process of receiving beacon signals from a wireless power receiver client at the wireless power transmission system and, in turn, responding with wireless power directed to that particular wireless power receiver client is referred to herein as retrodirective wireless power delivery.

Furthermore, as discussed herein, wireless power can be delivered in power cycles defined by power schedule information. A more detailed example of the signaling required to commence wireless power delivery is described now with reference to FIG. 14.

Figure 14:
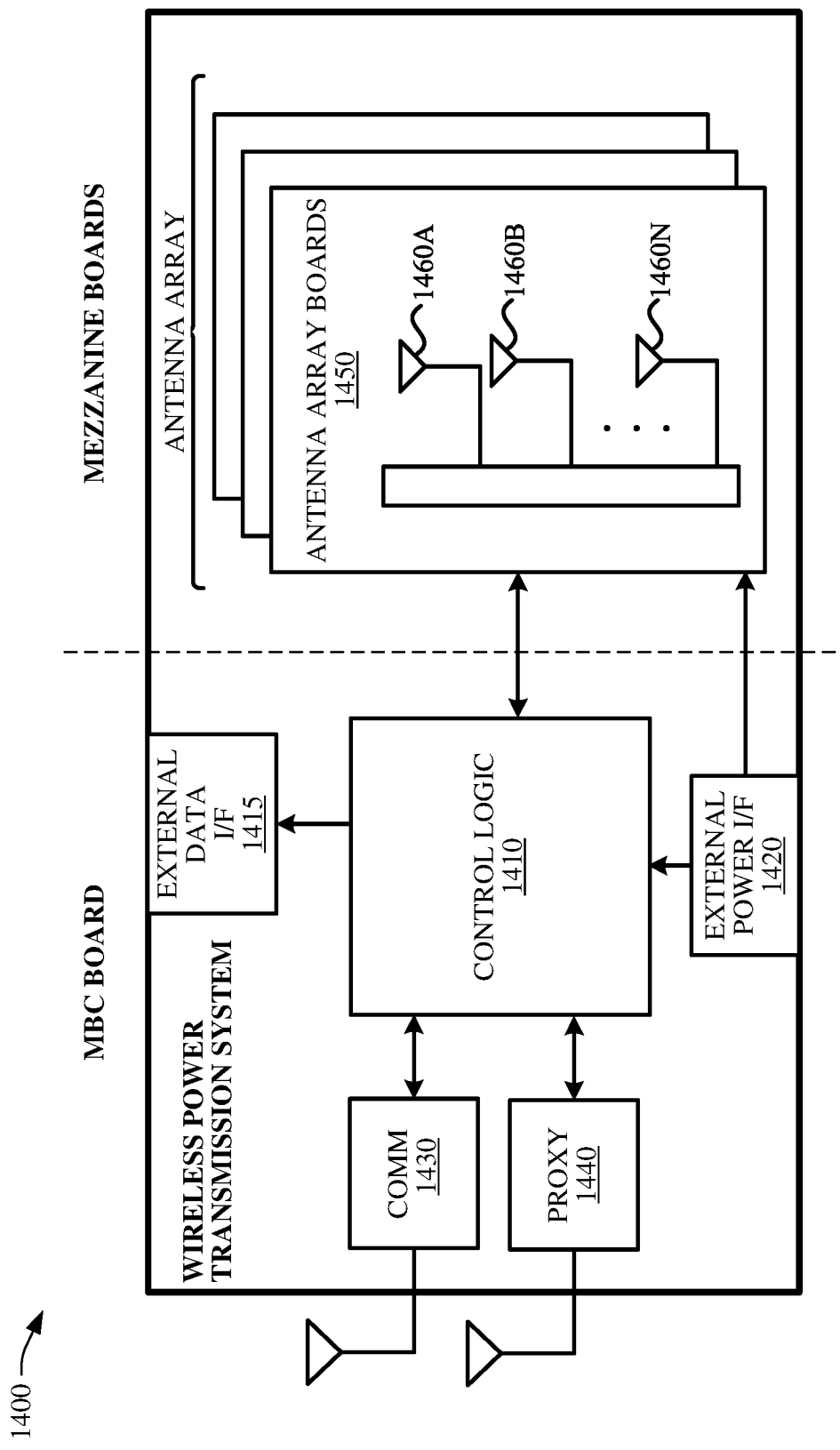
FIG. 14 depicts a block diagram illustrating example components of a wireless power transmission system, in accordance with various example embodiments of the subject matter disclosed herein.

FIG. 14 depicts a block diagram illustrating example components of a wireless power transmission system 1400, in accordance with an embodiment. As illustrated in the example of FIG. 14, the wireless power transmission system 1400 includes a master bus controller (MBC) board and multiple mezzanine boards that collectively comprise the antenna array. It should be appreciated that in other embodiment(s) (not shown), the wireless power transmission system 1400 can be communicatively coupled other such components, e.g., in addition to, or in lieu of, being communicatively coupled to the antenna array via the multiple mezzanine boards.

The MBC includes control logic 1410, an external data interface (I/F) 1415, an external power interface (I/F) 1420, a communication block 1430 and proxy 1440. The mezzanine boards (or antenna array boards 1450) each include multiple antennas 1460a-1460n. Some or all of the components can be omitted in some embodiments. Additional components are also possible. For example, in some embodiments only one of communication block 1430 or proxy 1440 may be included.

The control logic 1410 is configured to provide control and intelligence to the array components. The control logic 1410 may comprise one or more processors, FPGAs, memory units, etc., and direct and control the various data and power communications. The communication block 1430 can direct data communications on a data carrier frequency, such as the base signal clock for clock synchronization. The data communications can be Bluetooth™ WiFi™, ZigBee™, etc., including combinations or variations thereof. Likewise, the proxy 1440 can communicate with clients via data communications as discussed herein. The data communications can be, by way of example and not limitation, Bluetooth™, WiFi™, ZigBee™, etc. Other communication protocols are possible.

In some embodiments, the control logic 1410 can also facilitate and/or otherwise enable data aggregation for Internet of Things (IoT) devices. In some embodiments, wireless power receiver clients can access, track and/or otherwise obtain IoT information about the device in which the wireless power receiver client is embedded and provide that IoT information to the wireless power transmission system over a data connection. This IoT information can be provided to via an external data interface 1415 to a central or cloud-based system (not shown) where the data can be aggregated, processed, etc. For example, the central system can process the data to identify various trends across geographies, wireless power transmission systems, environments, devices, etc. In some embodiments, the aggregated data and or the trend data can be used to improve operation of the devices via remote updates, etc. Alternatively, or additionally, in some embodiments, the aggregated data can be provided to third party data consumers. In this manner, the wireless power transmission system acts as a Gateway or Enabler for the IoT devices. By way of example and not limitation, the IoT information can include capabilities of the device in which the wireless power receiver client is embedded, usage information of the device, power levels of the device, information obtained by the device or the wireless power receiver client itself, e.g., via sensors, etc.

The external power interface 1420 is configured to receive external power and provide the power to various components. In some embodiments, the external power interface 1420 may be configured to receive a standard external 24 Volt power supply. In other embodiments, the external power interface 1420 can be, for example, 130/240 Volt alternating current (AC) mains to an embedded direct current (DC) power supply that sources the required 13/24/48 Volt DC to provide the power to various components. Alternatively, the external power interface could be a DC power supply that sources the required 13/24/48 Volts DC. Alternative configurations are also possible.

In operation, the MBC, which controls the wireless power transmission system, receives power from a power source and is activated. The MBC then activates proxy antenna elements on the wireless power transmission system and the proxy antenna elements enter a default "discovery" mode to identify available wireless power receiver clients within range of the wireless power transmission system. When a client is found, the antenna elements on the wireless power transmission system power on, enumerate, and (optionally) calibrate.

The MBC then generates beacon transmission scheduling information and power transmission scheduling information during a scheduling process. The scheduling process includes selection of power receiver clients. For example, the MBC can select power receiver clients for power transmission and generate a BBS cycle and a Power Schedule (PS) for the selected wireless power receiver clients. As discussed herein, the power receiver clients can be selected based on their corresponding properties and/or requirements.

In some embodiments, the MBC can also identify and/or otherwise select available clients that will have their status queried in the Client Query Table (CQT). Clients that are placed in the CQT are those on "standby", e.g., not receiving a charge. The BBS and PS are calculated based on vital information about the clients such as, for example, battery status, current activity/usage, how much longer the client has until it runs out of power, priority in terms of usage, etc.

The Proxy Antenna Element (AE) broadcasts the BBS to all clients. As discussed herein, the BBS indicates when each client should send a beacon. Likewise, the PS indicates when and to which clients the array should send power to and when clients should listen for wireless power. Each client starts broadcasting its beacon and receiving power from the array per the BBS and PS. The Proxy AE can concurrently query the Client Query Table to check the status of other available clients. In some embodiments, a client can only exist in the BBS or the CQT (e.g., waitlist), but not in both. The information collected in the previous step continuously and/or periodically updates the BBS cycle and/or the PS.

Figure 15:
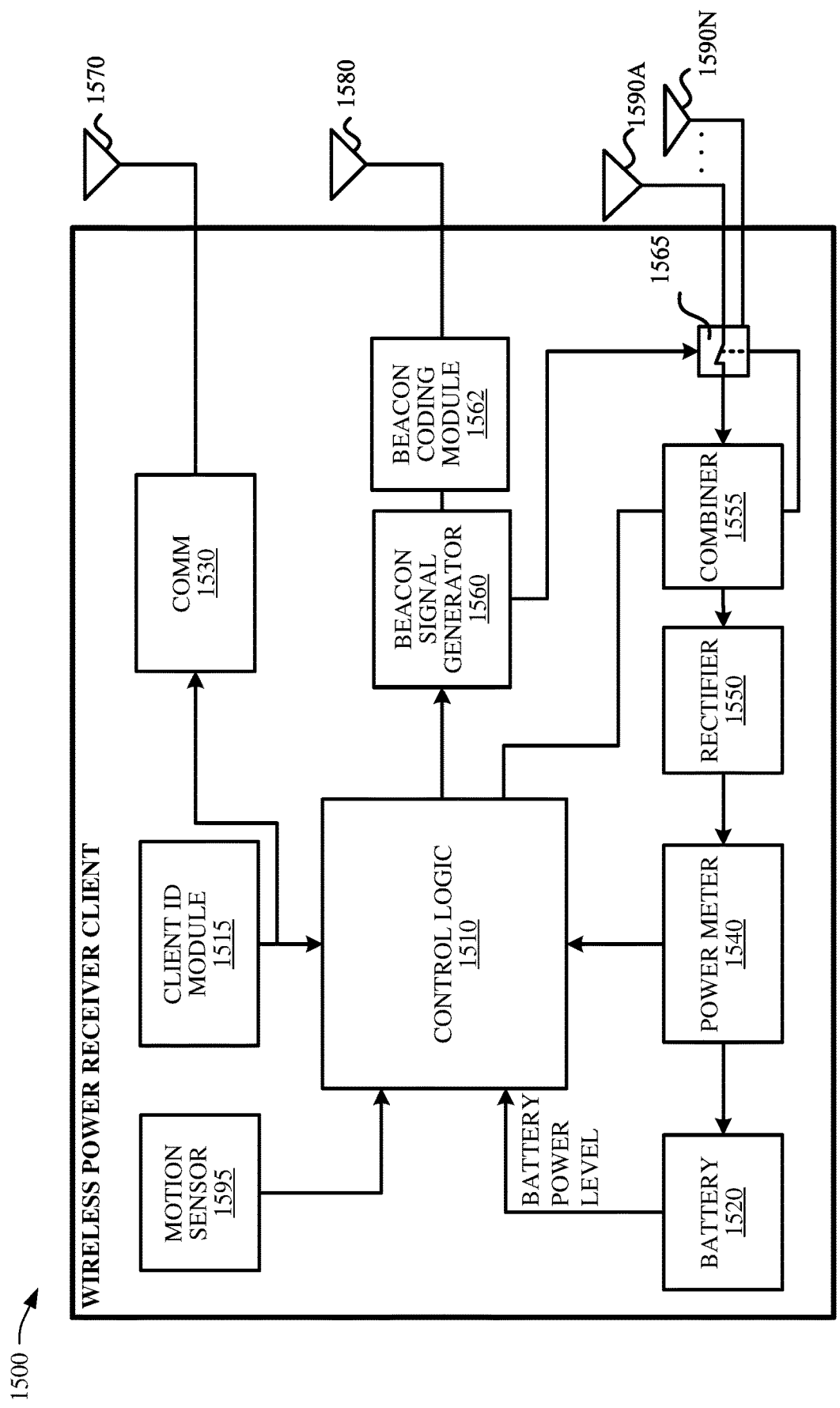
FIG. 15 depicts a block diagram illustrating example components of a wireless power receiver client, in accordance with various example embodiments of the subject matter disclosed herein.

FIG. 15 is a block diagram illustrating example components of a wireless power receiver client 1500, in accordance with some embodiments. As illustrated in the example of FIG. 15, the wireless power receiver client 1500 includes control logic 1510, battery 1520, an IoT control module 1525, communication block 1530 and associated antenna 1570, power meter 1540, rectifier 1550, a combiner 1555, beacon signal generator 1560, beacon coding unit 1562 and an associated antenna 1580, and switch 1565 connecting the rectifier 1550 or the beacon signal generator 1560 to one or more associated antennas 1590a-n. Some or all of the components can be omitted in some embodiments. For example, in some embodiments, the wireless power receiver client 1500 does not include its own antennas but instead utilizes and/or otherwise shares one or more antennas (e.g., Wi-Fi 33 antenna) of the wireless device in which the wireless power receiver client is embedded. Moreover, in some embodiments, the wireless power receiver client may include a single antenna that provides data transmission functionality as well as power/data reception functionality. Additional components are also possible.

A combiner 1555 receives and combines the received power transmission signals from the power transmitter in the event that the receiver 1500 has more than one antenna. The combiner can be any combiner or divider circuit that is configured to achieve isolation between the output ports while maintaining a matched condition. For example, the combiner 1555 can be a Wilkinson Power Divider circuit. The rectifier 1550 receives the combined power transmission signal from the combiner 1555, if present, which is fed through the power meter 1540 to the battery 1520 for charging. In other embodiments, each antenna's power path can have its own rectifier 1550 and the DC power out of the rectifiers is combined prior to feeding the power meter 1540. The power meter 1540 can measure the received power signal strength and provides the control logic 1510 with this measurement.

Battery 1520 can include protection circuitry and/or monitoring functions. Additionally, the battery 1520 can include one or more features, including, but not limited to, current limiting, temperature protection, over/under voltage alerts and protection, and coulomb monitoring.

The control logic 1510 receives and processes the battery power level from the battery 1520 itself. The control logic 1510 may also transmit/receive via the communication block 1530 a data signal on a data carrier frequency, such as the base signal clock for clock synchronization. The beacon signal generator 1560 generates the beacon signal, or calibration signal, transmits the beacon signal using either the antenna 1580 or 1590 after the beacon signal is encoded.

It may be noted that, although the battery 1520 is shown as charged by, and providing power to, the wireless power receiver client 1500, the receiver may also receive its power directly from the rectifier 1550. This may be in addition to the rectifier 1550 providing charging current to the battery 1520, or in lieu of providing charging. Also, it may be noted that the use of multiple antennas is one example of implementation and the structure may be reduced to one shared antenna.

In some embodiments, the control logic 1510 and/or the IoT control module 1525 can communicate with and/or otherwise derive IoT information from the device in which the wireless power receiver client 1500 is embedded. Although not shown, in some embodiments, the wireless power receiver client 1500 can have one or more data connections (wired or wireless) with the device in which the wireless power receiver client 1500 is embedded over which IoT information can be obtained. Alternatively, or additionally, IoT information can be determined and/or inferred by the wireless power receiver client 1500, e.g., via one or more sensors. As discussed above, the IoT information can include, but is not limited to, information about the capabilities of the device in which the wireless power receiver client 1500 is embedded, usage information of the device in which the wireless power receiver client 1500 is embedded, power levels of the battery or batteries of the device in which the wireless power receiver client 1500 is embedded, and/or information obtained or inferred by the device in which the wireless power receiver client is embedded or the wireless power receiver client itself, e.g., via sensors, etc.

In some embodiments, a client identifier (ID) module 1515 stores a client ID that can uniquely identify the wireless power receiver client 1500 in a wireless power delivery environment. For example, the ID can be transmitted to one or more wireless power transmission systems when communication is established. In some embodiments, wireless power receiver clients may also be able to receive and identify other wireless power receiver clients in a wireless power delivery environment based on the client ID.

An optional motion sensor 1595 can detect motion and signal the control logic 1510 to act accordingly. For example, a device receiving power may integrate motion detection mechanisms such as accelerometers or equivalent mechanisms to detect motion. Once the device detects that it is in motion, it may be assumed that it is being handled by a user, and would trigger a signal to the array to either to stop transmitting power, or to lower the power transmitted to the device. In some embodiments, when a device is used in a moving environment like a car, train or plane, the power might only be transmitted intermittently or at a reduced level unless the device is critically low on power.

Figure 16A:
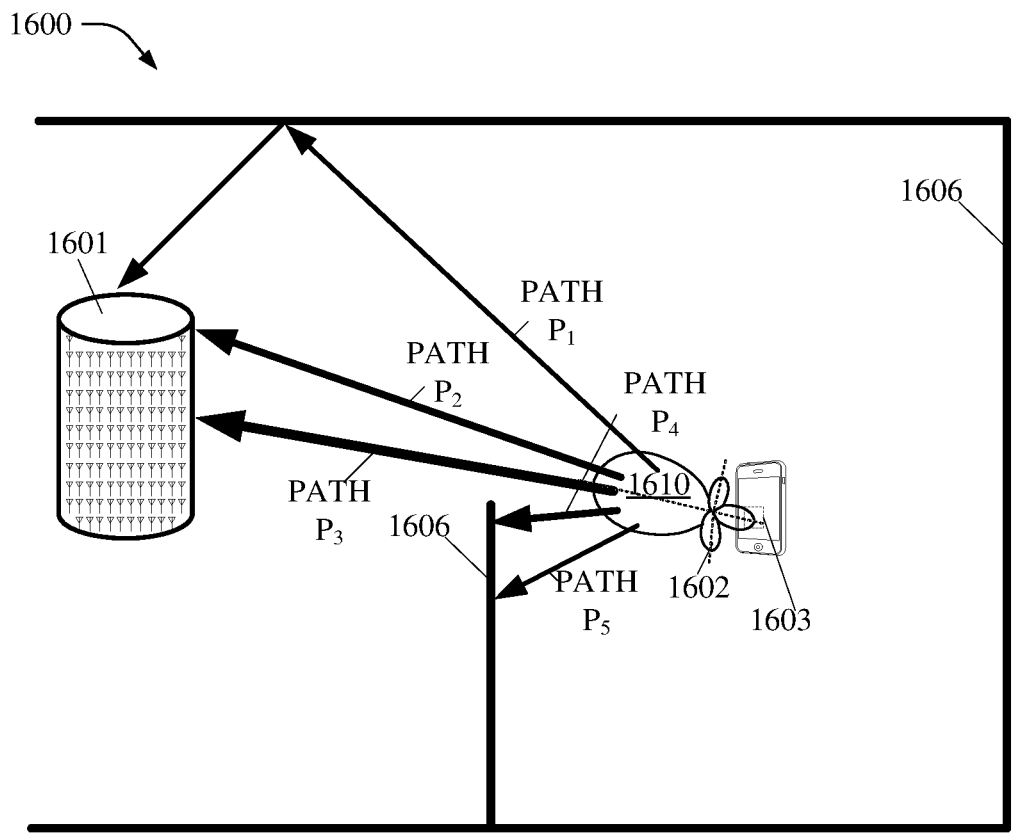
FIGS. 16A and 16B depict block diagrams illustrating example multipath wireless power delivery environments, in accordance with various example embodiments of the subject matter disclosed herein.
Figure 16B:
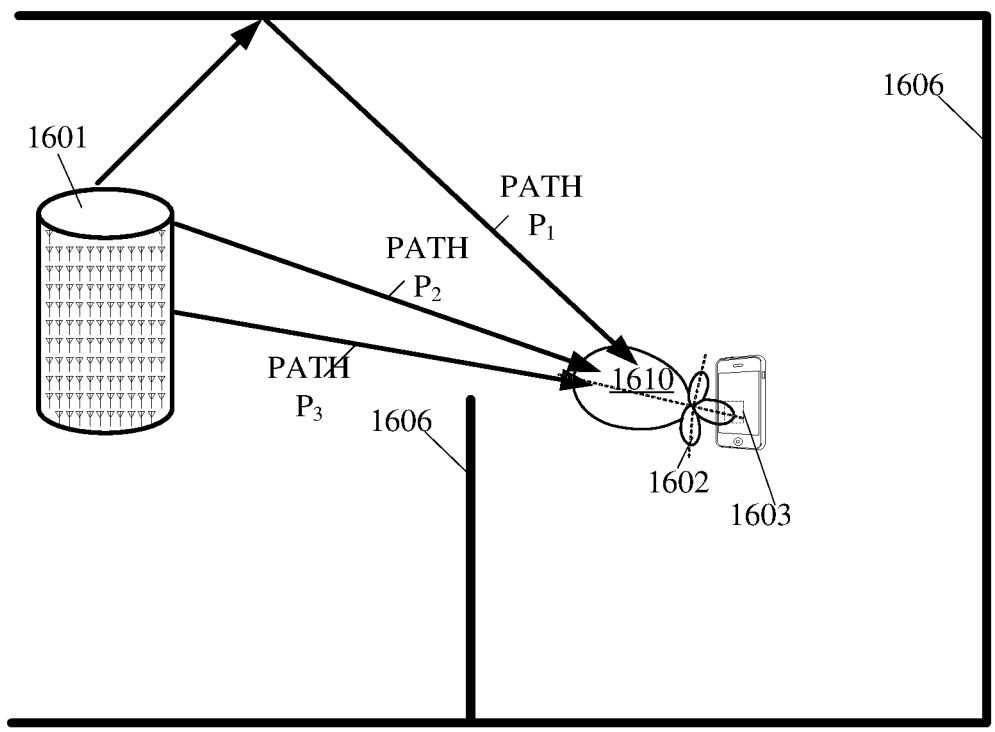
Figure 17:
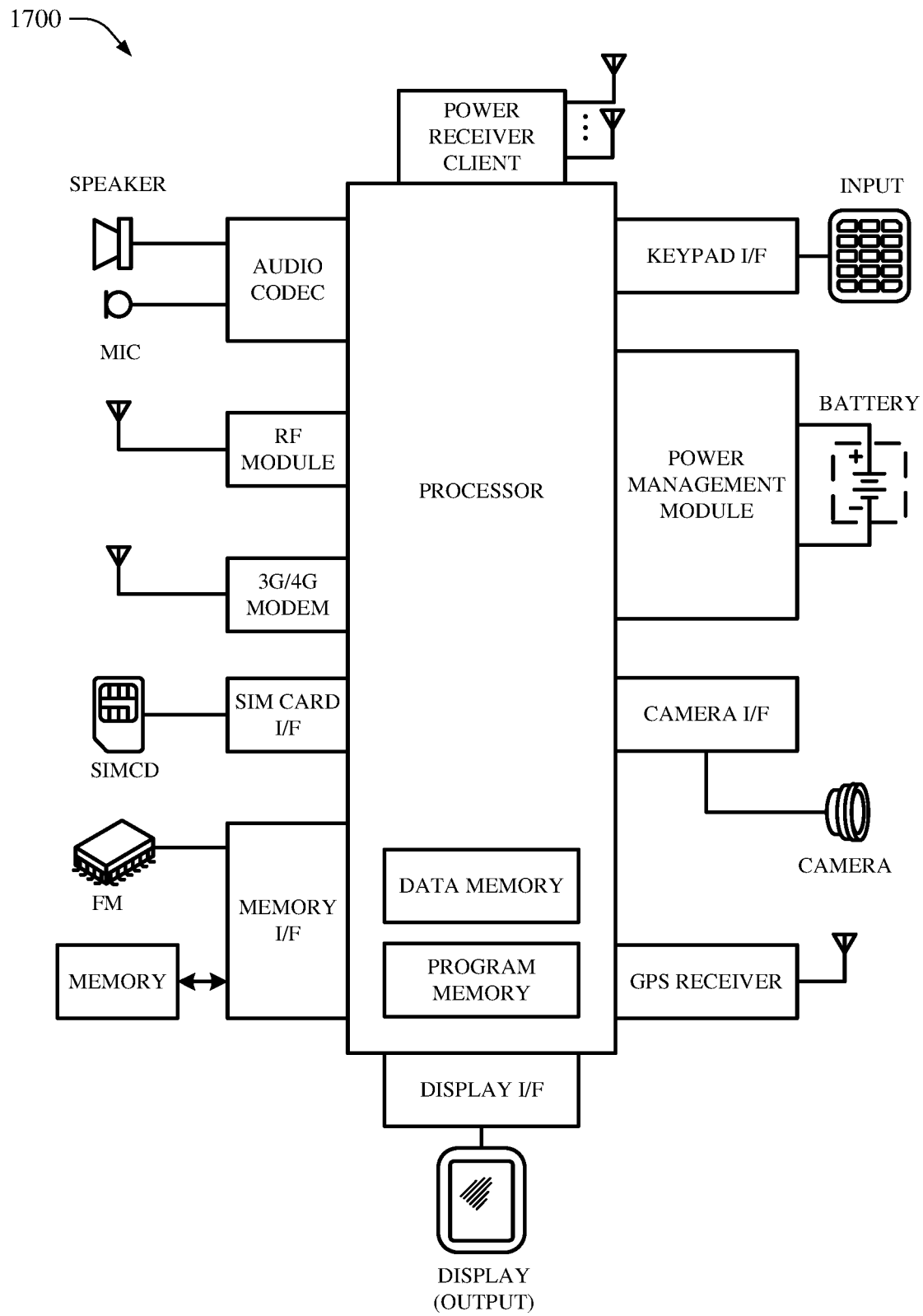
FIG. 17 depicts a block diagram illustrating example components of a representative mobile device or tablet computer with a wireless power receiver or client in the form of a mobile (or smart) phone or tablet computer device, in accordance with various example embodiments of the subject matter disclosed herein.

FIGS. 16A and 16B depict diagrams illustrating an example multipath wireless power delivery environment 1600, according to some embodiments. The multipath wireless power delivery environment 1600 includes a wireless device (e.g., 1610, 1602, etc.) including one or more wireless power receiver clients (e.g., 1603). The wireless device 1602 can be wireless device as described herein, and the one or more wireless power receiver clients 1603 can be a wireless power receiver client 1500, although alternative configurations are possible. Likewise, wireless power transmission system 1601 can be any of those depicted and/or described herein, for example, although alternative configurations are possible. The multipath wireless power delivery environment 1600 includes reflective objects 1606 and various absorptive objects.

Wireless device 1602 includes one or more antennas (or transceivers) that have a radiation and reception pattern 1610 in three-dimensional space proximate to the wireless device 1602. The one or more antennas (or transceivers) can be wholly or partially included as part of the wireless device 1602 and/or the wireless power receiver client (not shown). For example, in some embodiments one or more antennas, e.g., Wi-Fi, Bluetooth, etc. of the wireless device 1602 can be utilized and/or otherwise shared for wireless power reception. As shown in the examples of FIGS. 16A and 16B, the radiation and reception pattern 1610 comprises a lobe pattern with a primary lobe and multiple side lobes. Other patterns are also possible.

The wireless device 1602 transmits a beacon (or calibration) signal over multiple paths to the wireless power transmission system 1601. As discussed herein, the wireless device 1602 transmits the beacon in the direction of the radiation and reception pattern 1610 such that the strength of the received beacon signal by the wireless power transmission system, e.g., received signal strength indication (RSSI), depends on the radiation and reception pattern 1610. For example, beacon signals are not transmitted where there are nulls in the radiation and reception pattern 1610 and beacon signals are the strongest at the peaks in the radiation and reception pattern 1610, e.g., peak of the primary lobe. As shown in the example of FIG. 16A, the wireless device 1602 transmits beacon signals over five paths P1-P5. Paths P4 and P5 are blocked by reflective and/or absorptive object 1606. The wireless power transmission system 1601 receives beacon signals of increasing strengths via paths P1-P3. The bolder lines indicate stronger signals. In some embodiments, the beacon signals are directionally transmitted in this manner, for example, to avoid unnecessary RF energy exposure to a user; (although a shielded container as described herein operates to prevent such exposure).

A fundamental property of antennas is that the receiving pattern (sensitivity as a function of direction) of an antenna when used for receiving is identical to the far-field radiation pattern of the antenna when used for transmitting. This is a consequence of the reciprocity theorem in electromagnetism. As shown in the example of FIGS. 16A and 16B, the radiation and reception pattern 1610 is a three-dimensional lobe shape. However, the radiation and reception pattern 1610 can be any number of shapes depending on the type or types, e.g., horn antennas, simple vertical antenna, etc. used in the antenna design. For example, the radiation and reception pattern 1610 can comprise various directive patterns. Any number of different antenna radiation and reception patterns are possible for each of multiple client devices in a wireless power delivery environment.

Referring again to FIG. 16A, the wireless power transmission system 1601 receives the beacon (or calibration) signal via multiple paths P1-P3 at multiple antennas or transceivers. As shown, paths P2 and P3 are direct line of sight paths while path P1 is a non-line of sight path. Once the beacon (or calibration) signal is received by the wireless power transmission system 1601, the power transmission system 1601 processes the beacon (or calibration) signal to determine one or more receive characteristics of the beacon signal at each of the multiple antennas. For example, among other operations, the wireless power transmission system 1601 can measure the phases at which the beacon signal is received at each of the multiple antennas or transceivers.

The wireless power transmission system 1601 processes the one or more receive characteristics of the beacon signal at each of the multiple antennas to determine or measure one or more wireless power transmit characteristics for each of the multiple RF transceivers based on the one or more receive characteristics of the beacon (or calibration) signal as measured at the corresponding antenna or transceiver. By way of example and not limitation, the wireless power transmit characteristics can include phase settings for each antenna or transceiver, transmission power settings, etc.

As discussed herein, the wireless power transmission system 1601 determines the wireless power transmit characteristics such that, once the antennas or transceivers are configured, the multiple antennas or transceivers are operable to transit a wireless power signal that matches the client radiation and reception pattern in the three-dimensional space proximate to the client device. FIG. 16B illustrates the wireless power transmission system 1601 transmitting wireless power via paths P1-P3 to the wireless device 1602. Advantageously, as discussed herein, the wireless power signal matches the client radiation and reception pattern 1610 in the three-dimensional space proximate to the client device. Said another way, the wireless power transmission system will transmit the wireless power signals in the direction in which the wireless power receiver has maximum gain, e.g., will receive the most wireless power. As a result, no signals are sent in directions in which the wireless power receiver cannot receive power, e.g., nulls and blockages. In some embodiments, the wireless power transmission system 1601 measures the RSSI of the received beacon signal and if the beacon is less than a threshold value, the wireless power transmission system will not send wireless power over that path.

The three paths shown in the examples of FIGS. 16A and 16B are illustrated for simplicity, it is appreciated that any number of paths can be utilized for transmitting power to the wireless device 1602 depending on, among other factors, reflective and absorptive objects in the wireless power delivery environment. Although the example of FIG. 16A illustrates transmitting a beacon (or calibration) signal in the direction of the radiation and reception pattern 1610, it is appreciated that, in some embodiments, beacon signals can alternatively or additionally be omni-directionally transmitted.

FIG. 16 depicts a block diagram illustrating example components of a representative mobile device or tablet computer 1600 with a wireless power receiver or client in the form of a mobile (or smart) phone or tablet computer device, according to an embodiment. Various interfaces and modules are shown with reference to FIG. 16, however, the mobile device or tablet computer does not require all of modules or functions for performing the functionality described herein. It is appreciated that, in many embodiments, various components are not included and/or necessary for operation of the category controller. For example, components such as GPS radios, cellular radios, and accelerometers may not be included in the controllers to reduce costs and/or complexity. Additionally, components such as ZigBee radios and RF identification (RFID) transceivers, along with antennas, can populate a PCB.

The wireless power receiver client can be a power receiver client 1603 of FIG. 16, although alternative configurations are possible. Additionally, the wireless power receiver client can include one or more RF antennas for reception of power and/or data signals from a charger, e.g., WPTS 1601 of FIG. 16.

Figure 18:
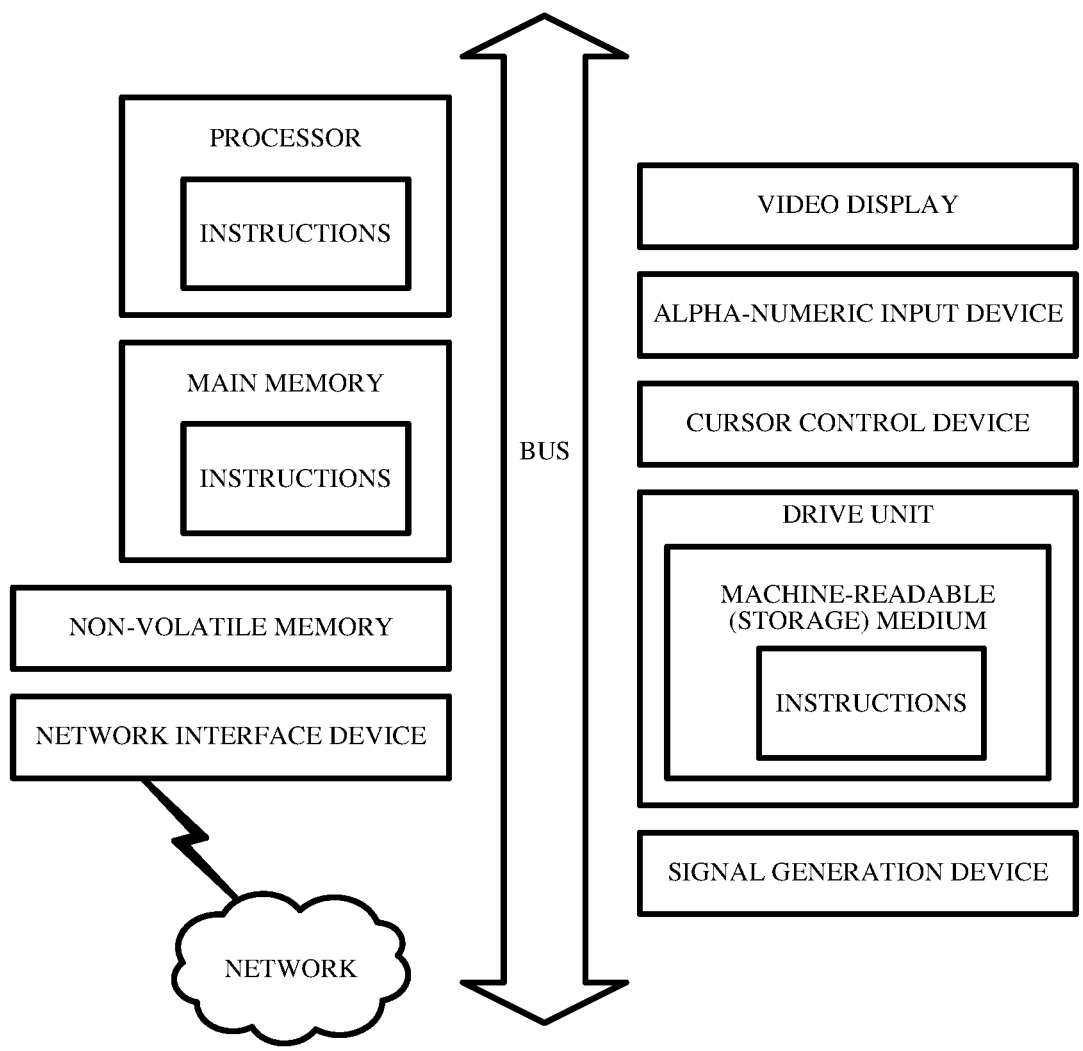
FIG. 18 depicts a diagrammatic representation of a machine, in an example form, of a computer system within which a set of instructions, for causing the machine to perform any one or more of the methodologies discussed herein, may be executed, in accordance with various example embodiments of the subject matter disclosed herein.

FIG. 18 depicts a diagrammatic representation of a machine, in the example form, of a computer system within which a set of instructions, for causing the machine to perform any one or more of the methodologies discussed herein, may be executed.

In the example of FIG. 18, the computer system includes a processor, memory, non-volatile memory, and an interface device. Various common components (e.g., cache memory) are omitted for illustrative simplicity. The computer system 1800 is intended to illustrate a hardware device on which any of the components depicted, e.g., in FIG. 1, FIG. 16, etc. (and any other components described in this specification) can be implemented. For example, the computer system can be any radiating object or antenna array system. The computer system can be of any applicable known or convenient type. The components of the computer system can be coupled together via a bus or through some other known or convenient device.

The processor may be, for example, a conventional microprocessor such as an Intel Pentium microprocessor or Motorola power PC microprocessor. One of skill in the relevant art will recognize that the terms "machine-readable (storage) medium" or "computer-readable (storage) medium" include any type of device that is accessible by the processor.

The memory is coupled to the processor by, for example, a bus. The memory can include, by way of example but not limitation, random access memory (RAM), such as dynamic RAM (DRAM) and static RAM (SRAM). The memory can be local, remote, or distributed.

The bus also couples the processor to the non-volatile memory and drive unit. The non-volatile memory is often a magnetic floppy or hard disk, a magnetic-optical disk, an optical disk, a read-only memory (ROM), such as a compact disk ROM (CD-ROM), electrically programmable ROM (EPROM), or electrically erasable ROM (EEPROM), a magnetic or optical card, or another form of storage for large amounts of data. Some of this data is often written, by a direct memory access process, into memory during execution of software in the computer 1800. The non-volatile storage can be local, remote, or distributed. The non-volatile memory is optional because systems can be created with all applicable data available in memory. A typical computer system will usually include at least a processor, memory, and a device (e.g., a bus) coupling the memory to the processor.

Software is typically stored in the non-volatile memory and/or the drive unit. Indeed, for large programs, it may not even be possible to store the entire program in the memory. Nevertheless, it should be understood that for software to run, if necessary, it is moved to a computer readable location appropriate for processing, and for illustrative purposes, that location is referred to as the memory in this paper. Even when software is moved to the memory for execution, the processor will typically make use of hardware registers to store values associated with the software, and local cache that, ideally, serves to speed up execution. As used herein, a software program is assumed to be stored at any known or convenient location (from non-volatile storage to hardware registers) when the software program is referred to as "implemented in a computer-readable medium". A processor is considered to be "configured to execute a program" when at least one value associated with the program is stored in a register readable by the processor.

The bus also couples the processor to the network interface device. The interface can include one or more of a modem or network interface. It will be appreciated that a modem or network interface can be considered to be part of the computer system. The interface can include an analog modem, an integrated services digital network (ISDN) modem, cable modem, token ring interface, satellite transmission interface (e.g. "direct PC"), or other interfaces for coupling a computer system to other computer systems. The interface can include one or more input and/or output (I/O) devices. The I/O devices can include, by way of example but not limitation, a keyboard, a mouse or other pointing device, disk drives, printers, a scanner, and other input and/or output devices, including a display device. The display device can include, by way of example but not limitation, a cathode ray tube (CRT), liquid crystal display (LCD), or some other applicable known or convenient display device. For simplicity, it is assumed that controllers of any devices not depicted in the example of FIG. 18 reside in the interface.

In operation, the computer system 1800 can be controlled by operating system software that includes a file management system, such as a disk operating system. One example of operating system software with associated file management system software is the family of operating systems known as Windows® from Microsoft Corporation of Redmond, Washington, and their associated file management systems. Another example of operating system software with its associated file management system software is the Linux operating system and its associated file management system. The file management system is typically stored in the non-volatile memory and/or drive unit and causes the processor to execute the various acts required by the operating system to input and output data and to store data in the memory, including storing files on the non-volatile memory and/or drive unit.

As generally employed in the subject specification, the term "processing component" can refer to substantially any computing processing unit or device comprising, but not limited to comprising, single-core processors; single-processors with software multithread execution capability; multi-core processors; multi-core processors with software multi-thread execution capability; multi-core processors with hardware multithread technology; parallel platforms; and parallel platforms with distributed shared memory. Additionally, a processing component can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions and/or processes described herein. A processing component can exploit nano-scale architectures such as, but not limited to, molecular and quantum-dot based transistors, switches and gates, in order to optimize space usage or enhance performance of components described herein. Further, a processing component can also be implemented as a combination of computing processing units.

In the subject specification, term "memory component" and substantially any other information storage component relevant to operation and functionality of a component and/or process described herein, refer to entities embodied in a "memory," or components comprising the memory. It will be appreciated that a memory component described herein can be either volatile memory or nonvolatile memory, or can include both volatile and nonvolatile memory.

By way of illustration, and not limitation, nonvolatile memory, for example, can be included in ROM, programmable ROM (PROM), EPROM, EPROM, or flash memory. Volatile memory can include RAM, which acts as external cache memory. By way of illustration and not limitation, RAM is available in many forms such as SRAM, DRAM, synchronous DRAM (SDRAM), double data rate SDRAM (DDR SDRAM), enhanced SDRAM (ESDRAM), Synchlink DRAM (SLDRAM), and direct Rambus RAM (DR-RAM). Additionally, the disclosed memory components of systems or methods herein are intended to comprise, without being limited to comprising, these and any other suitable types of memory.

Aspects of systems, apparatus, and processes explained herein can constitute machine-executable instructions embodied within a machine, e.g., embodied in a computer readable medium (or media) associated with the machine. Such instructions, when executed by the machine, can cause the machine to perform the operations described. Additionally, systems, processes, process blocks, etc. can be embodied within hardware, such as an application specific integrated circuit (ASIC) or the like. Moreover, the order in which some or all of the process blocks appear in each process should not be deemed limiting. Rather, it should be understood by a person of ordinary skill in the art having the benefit of the instant disclosure that some of the process blocks can be executed in a variety of orders not illustrated.

As another example, a component can be an apparatus with specific functionality provided by mechanical parts operated by electric or electronic circuitry; the electric or electronic circuitry can be operated by a software application or a firmware application executed by one or more processors; the one or more processors can be internal or external to the apparatus and can execute at least a part of the software or firmware application. As yet another example, a component can be an apparatus that provides specific functionality through electronic components without mechanical parts; the electronic components can include one or more processors therein to execute software and/or firmware that confer(s), at least in part, the functionality of the electronic components.

Further, the word "exemplary" and/or "demonstrative" is used herein to mean serving as an example, instance, or illustration. For the avoidance of doubt, the subject matter disclosed herein is not limited by such examples. In addition, any aspect or design described herein as "exemplary" and/or "demonstrative" is not necessarily to be construed as preferred or advantageous over other aspects or designs, nor is it meant to preclude equivalent exemplary structures and techniques known to those of ordinary skill in the art having the benefit of the instant disclosure.

Furthermore, to the extent that the terms "includes," "has," "contains," and other similar words are used in either the detailed description or the appended claims, such terms are intended to be inclusive—in a manner similar to the term "comprising" as an open transition word—without precluding any additional or other elements. Moreover, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

As used herein, the terms "connected," "coupled," or any variant thereof, means any connection or coupling, either direct or indirect, between two or more elements; the coupling of connection between the elements can be physical, logical, or a combination thereof. Where context permits, words in the above Detailed Description using the singular or plural number may also include the plural or singular number respectively. The word "or," in reference to a list of two or more items, covers all of the following interpretations of the word: any of the items in the list, all of the items in the list, and any combination of the items in the list.

The above detailed description of embodiments of the disclosure is not intended to be exhaustive or to limit the teachings to the precise form disclosed above. While specific embodiments of, and examples for, the disclosure are described above for illustrative purposes, various equivalent modifications are possible within the scope of the disclosure, as those skilled in the relevant art will recognize. For example, while processes or blocks are presented in a given order, alternative embodiments may perform routines having steps, or employ systems having blocks, in a different order, and some processes or blocks may be deleted, moved, added, subdivided, combined, and/or modified to provide alternative or subcombinations. Each of these processes or blocks may be implemented in a variety of different ways. Also, while processes or blocks are, at times, shown as being performed in a series, these processes or blocks may instead be performed in parallel, or may be performed at different times. Further, any specific numbers noted herein are only examples: alternative implementations may employ differing values or ranges.

The teachings of the disclosure provided herein can be applied to other systems, not necessarily the system described above. The elements and acts of the various embodiments described above can be combined to provide further embodiments.

The above description of illustrated embodiments of the subject disclosure, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the disclosed subject matter has been described in connection with various embodiments and corresponding figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

What is claimed is:

1. A system, comprising:
   a container comprising an electromagnetically shielded enclosure with respect to a wireless charging output when the container is in a closed state, wherein the container is radio frequency (RF) shielded via a quarter wavelength choke, and wherein the quarter wavelength choke is configurable to be deactivated within a defined RF communication window that enables communication with a wireless power receiver device within the container when the container is in the closed state;
   a wireless power transmitter device that is configured to transmit the wireless charging output to the wireless power receiver device within the container;
   a controller that is coupled to the wireless power transmitter device, the controller controlling an output power state of the wireless power transmitter device; and
   a sensor that detects whether the container is in the closed state, the sensor communicatively coupled to the controller to indicate whether the container is in the closed state, wherein, in response to the sensor indicating that the container is in the closed state, the controller controls the wireless power transmitter device to transmit the wireless charging output to the wireless power receiver device.

2. The system of claim 1, wherein the sensor detects whether the container is in an open state, and wherein, in response to the sensor indicating that that container is in the open state, the controller controls the wireless power transmitter device to reduce or cease transmission of the wireless charging output.

3. The system of claim 1, further comprising an electromagnetic locking device that locks the container to establish the closed state.

4. The system of claim 1, wherein the sensor is a first sensor, and wherein a second sensor detects at least one of:
whether electromagnetic radiation corresponding to the wireless charging output from the wireless power transmitter device is detected external to the container when the container is in the closed state, or
whether electromagnetic radiation corresponding to the wireless charging output from the wireless power transmitter device is detected internal to the container at a time that the wireless power transmitter device is not transmitting.

5. The system of claim 1, wherein the container is incorporated into a machine, the machine configured to dispense the wireless power receiver device when the wireless power receiver device has reached a defined state of charge level.

6. The system of claim 1, wherein the container is incorporated into a vending machine, the vending machine configured to dispense the wireless power receiver device in response to purchase or rental.

7. The system of claim 1, wherein the controller obtains a state of charge from the wireless power receiver device, and wherein the controller selects the wireless power receiver device for charging via the wireless charging output based on the state of charge.

8. The system of claim 1, wherein the wireless power receiver device comprises one of a group of wireless power receiver devices within the container, and wherein the controller selects the wireless power receiver device for charging via the wireless charging output based at least in part on round robin selection.

9. The system of claim 1, wherein the wireless power receiver device comprises a first wireless power receiver device of a group of wireless power receiver devices within the container, and wherein the controller charges the first wireless power receiver device via the wireless charging output in parallel or substantially in parallel with charging a second wireless power receiver device of the group via the wireless charging output.

10. The system of claim 1, wherein the wireless charging output is transmitted at a first portion of a timeframe to the wireless power receiver device, and wherein a second portion of the timeframe facilitates communication with the wireless power receiver device.

11. The system of claim 1, further comprising at least one of:
an antenna coupled to an exterior of the container to facilitate a first component communication with a first component that is located within the container when the container is in the closed state,
an interface port that is coupled to an exterior of the container to facilitate the first component communication with the first component that is located within the container when the container is in the closed state, or
an interface coupled to the container that facilitates a second component communication between the first component that is located within the container and a second component that is external to the container.

12. The system of claim 1, wherein the controller performs at least one of: failure detection of the container, or failure detection of the wireless power receiver device.

13. The system of claim 1, wherein the container is coupled to obtain power via at least one of: an uninterruptable power supply, or an integrated photovoltaic panel.

14. The system of claim 1, wherein at least part of the container is transparent to visible light.

15. A method, comprising:
transmitting, by a system comprising a processor via a wireless power transmission device, wireless charging output to a wireless power reception device within a container, wherein, in response to the container being in a closed state, the container comprises an electromagnetically shielded enclosure with respect to the wireless charging output;
radio frequency (RF) shielding, by the system, the container using a quarter wavelength choke that is configurable to be deactivated within a defined RF communication window that enables communication with the wireless power reception device within the container when the container is in the closed state;
modifying, by the system, an output power state of the wireless power transmission device; and
in response the container being detected to be in the closed state, transmitting, by the system via the wireless power transmission device, the wireless charging output to the wireless power reception device.

16. A method, comprising:
transmitting, by a system comprising a processor via a wireless power transmission device, wireless charging output to a wireless power reception device within a container, wherein, in response to the container being in a closed state, the container comprises an electromagnetically shielded enclosure with respect to the wireless charging output, and wherein the container is radio frequency (RF) shielded utilizing a quarter wavelength choke that is configurable to be deactivated within a defined RF communication window that enables communication with the wireless power reception device within the container when the container is in the closed state; and
in response the container being detected to be in the closed state, transmitting, by the system via the wireless power transmission device, the wireless charging output to the wireless power reception device.

17. The method of claim 16, further comprising:
in response to the container being detected to be in an open state, reducing, by the system, transmission of the wireless charging output.

18. The method of claim 16, wherein the reducing of the transmission comprises:
ceasing the transmission of the wireless charging output.

19. The method of claim 16, further comprising:
performing, by the system, failure detection of the container with respect to at least one of a door sealing failure of the container or damage of the system.

20. The method of claim 16, further comprising:
performing, by the system, failure detection of the wireless power reception device with respect to placement of the wireless power reception device within the container.

* * * * *